United States Patent [19]
Toyama

[11] Patent Number: 5,590,217
[45] Date of Patent: Dec. 31, 1996

[54] VEHICLE ACTIVITY MEASURING APPARATUS

[75] Inventor: Masakazu Toyama, Tokyo, Japan

[73] Assignee: Matsushita Electric Industrial Co., Ltd., Osaka, Japan

[21] Appl. No.: 272,377

[22] Filed: Jul. 6, 1994

Related U.S. Application Data

[63] Continuation of Ser. No. 862,426, Apr. 2, 1992, abandoned.

[30] Foreign Application Priority Data

| Apr. 8, 1991 | [JP] | Japan | 3-075024 |
| Apr. 8, 1991 | [JP] | Japan | 3-075026 |
| Apr. 12, 1991 | [JP] | Japan | 3-079587 |
| Apr. 16, 1991 | [JP] | Japan | 3-083892 |

[51] Int. Cl.$^6$ ........................................ G06K 9/00
[52] U.S. Cl. ............................. 382/104; 348/149
[58] Field of Search ............................. 382/103, 104, 382/283, 286, 291, 168; 348/148, 149

[56] References Cited

U.S. PATENT DOCUMENTS

| 4,433,325 | 2/1984 | Tanaka et al. | 340/937 |
| 4,535,334 | 8/1985 | Tagami et al. | 340/995 |
| 4,891,559 | 1/1990 | Matsumoto et al. | 315/82 |
| 5,083,200 | 1/1992 | Deffontaines | 358/105 |
| 5,101,200 | 3/1992 | Swett | 340/937 |
| 5,103,305 | 4/1992 | Watanabe | 358/105 |
| 5,243,663 | 9/1993 | Kudoh | 382/1 |

FOREIGN PATENT DOCUMENTS

| 4-52999 | 2/1992 | Japan | G08G 1/07 |

OTHER PUBLICATIONS

Yasuo Kudo; Traffic flow measurement system using image processing; Jan. 17, 86; 11 pages (pp. 62–72).

Tomasz Abramczuk; A microcomputer based TV–detector for road traffic 1984; 10 pages.

P. G. Michalopoulos & R. Fitch; Development of a wide area vehicle detector through video image processing; 1986; 6 pages (52–57).

*Primary Examiner*—Yon J. Couso
*Attorney, Agent, or Firm*—Spencer & Frank

[57] ABSTRACT

The present invention provides vehicle activity data by accurately measuring and collecting traffic information, such as vehicle speed, number of passing vehicles, types such as small size and large size of the vehicles. The invention allows tracing of a vehicle which makes a lane change, avoids influence of a large size vehicle for measurement in an adjacent lane, and provides an approach for obtaining vehicle activity data at night time or in the rain. The apparatus stores video information from a video camera in image memories. The stored current image data and background data are processed by an image processing section to assign identification number for respective individual vehicles. Results of tracing include a position of the front end of the vehicle in a measuring area, a vehicle width, and both end positions of the vehicle are stored in time sequence. A computer calculates speed over one second for respective processed frames on the basis of vehicle position information for a given number of preceding frames, provides weights for respective calculated speeds and performs averaging for deriving an accurate vehicle speed.

13 Claims, 22 Drawing Sheets

NORMAL MEASURING AREA

MEASURING AREA INFLUENCED BY LARGE SIZE VEHICLE

ORIGINAL IMAGE

SIMPLIFIED COORDINATE CONVERSION

VEHICLE ACTIVITY MEASURING APPARATUS

This application is a Continuation, of application Ser. No. 07/862,426, filed Apr. 2, 1992 now abandoned.

BACKGROUND OF THE INVENTION

The present invention relates to a vehicle activity measuring apparatus which is located on a road for monitoring road traffic, such as vehicle speed, number of passing vehicles, types of passing vehicles, e.g., small size vehicle, large size vehicle and so forth, and for collecting vehicle activity data.

Conventionally, such a vehicle activity measuring apparatus performs image processing of background image data and current image data taken to show activities of vehicles on the road for measuring passing vehicle speeds, number of the passing vehicles, types of passing vehicles, e.g., small size vehicle, large size vehicle or so forth, and thus output information indicative of results of measurement.

In addition, the apparatus extracts the front end of a particular vehicle and obtains amount of movement of the front end to give the vehicle speed. Namely, the amount of movement of a particular vehicle is derived on the basis of a positional difference between a current position of the front end of the particular vehicle and an immediately preceding position of the front end of the particular vehicle, and the processing time.

However, in the above-mentioned conventional vehicle activity measuring device, when failure of extraction of the particular vehicle is caused during tracing of the vehicle, the device terminates tracing and measurement, and when the same particular vehicle is extracted in a subsequent process, the device starts tracing and measurement for the particular vehicle again as a new particular vehicle. As a result, the data for the single vehicle may be erroneously recorded as data for two vehicles.

Furthermore, when a temporary offset of the extracted front end image of the vehicle relative to the actual front end position occurs, such an offset may instantly affect measurement of the vehicle speed.

On the other hand, the above-mentioned conventional vehicle activity measuring apparatus is set with a measuring area corresponding to one lane, and when the particular vehicle traced by the apparatus changes its running lane from the monitoring lane, the apparatus fails to trace the particular vehicle. In addition, in case that the particular vehicle to be traced is a large size vehicle, it can be detected not only on the running lane but also on the adjacent lane due to its imaging angle causing an erroneous detection.

Additionally, the above-mentioned conventional vehicle activity measuring apparatus is basically designed for performing measurement of a running vehicle and is difficult to detect presence of stopped vehicles, such as those stopped due to heavy traffic in the day time (hereafter, simply referred to as "presence detection").

Furthermore, in the night time, the apparatus performs tracing and measurement of the vehicles by detecting head lights. However, when the vehicles stop in traffic jam, the head lights may be turned off with small lamps on. Presence detection in such circumstances is more difficult.

Also, in the above-mentioned conventional vehicle activity measuring apparatus, tracing and measurement are performed by detecting a pair of head lights in the night time. Erroneous detections may be caused by reflected head lights from a wet road surface during rain.

Furthermore, when light axes of the head lights are in oblique in the field due to the imaging angle, it may become difficult to detect a pair of head lights if the process is performed in a respective scanning. It is particularly difficult to detect small lamps with low luminance stimulating a small number of pixels, which are lit simultaneously with or instead of the head lights.

SUMMARY OF THE INVENTION

The present invention solves the problem set forth above and thus it is an object of the present invention to provide an advanced vehicle activity measuring apparatus which is capable of acquiring accurate vehicle activity data derived from measurement and collection of various traffic information including vehicle speeds, number of passing vehicles and types of the vehicles, e.g., small size and large size passing vehicles and so forth.

In order to accomplish the above-mentioned object, an identification number is assigned to each vehicle for which tracing and measurement is performed so that it becomes possible to store vehicle information in time sequence, such as vehicle position in a measuring zone, vehicle speed, vehicle acceleration, and positions of both ends of the vehicle of the traced vehicle.

On the other hand, an accurate vehicle speed is derived by calculating speed in one second for every set of processing image frames based on position information over several preceding frames, weighting the respective calculated speeds with certain constants and averaging the resultant speeds.

The present invention constructed as set forth above achieves the following effects.

The vehicle information can be stored in time sequence so that more detailed analysis may be performed by a computer to which the stored data is transferred. Furthermore, it becomes possible that the computer predicts the vehicle activity on the basis of the stored data even when extraction of the vehicle is temporarily failed, to make a continuous measurement of the vehicle.

Furthermore, even when a temporary offset of the extracted front end position of a vehicle from the actual front end position occurs, influence for speed measurement can be minimized by the computer for enabling accurate tracing and measurement process. In addition, since tracing and measurement for the vehicle can be performed continuously without interruption even when extraction of the vehicle has temporarily failed, more accurate measurement and collection of the vehicle information are available.

It is another object of the present invention to provide an advanced vehicle activity measuring apparatus which can perform accurate measurement and collection of necessary traffic information, such as the vehicle speed, the number of passing vehicles, vehicle types (standard size vehicles/large size vehicles) and so forth, with avoiding influence of lane change of the vehicles or influence of the large size vehicle running on the adjacent lane and so forth.

In order to achieve the above-mentioned object, the apparatus measures a width of each vehicle for classifying the type of vehicles into three kinds, i.e., large size vehicles, small size vehicles and parts of the vehicles, and determines the traveling position of the vehicle in the lane on the basis of the positions of the left and right side ends of the vehicle in the lane.

In addition, by determining the traveling position of the running vehicle within the lane, the apparatus can trace and follow the vehicle which makes a lane change on the basis of the result of determined traveling position.

Furthermore, by determining the traveling position of the vehicle within the lane, influence for measurement of a large size vehicle traveling on the adjacent lane can be successfully avoided.

With the construction set forth above, the following effect can be achieved.

First of all, by measuring and tracing traveling position of a traveling vehicle within a lane, it becomes possible to make a judgment when the vehicle performs a lane change. Also, based on the traveling position of a large size vehicle, a judgment can be made whether the vehicle will influence a measurement for an adjacent lane in terms of the imaging angle.

Secondly, even when the vehicle performs a lane change, the apparatus may follow the vehicle to continue tracing so that it may perform a measurement for a long traveling distance.

Thirdly, since influence of a large size vehicle can be avoided, highly accurate measurement of traffic information becomes possible at any lane.

It is a further object of the present invention to provide an advanced vehicle activity measuring apparatus which can perform accurate measurement and collection of data for a number of passing vehicles even in the case of a traffic jam during the day or in the case when vehicles turn on only small lamps during the night.

In order to accomplish the above-mentioned object, a vehicle activity measuring apparatus employs a video camera for obtaining image data by picking up vehicle activities on a road and processes the image data for measuring and collecting data of the vehicle activities. The apparatus can perform presence detection for a stopped vehicle during daytime by measuring an average luminance at a measuring zone and a most frequently occurring luminance value in a current image data and a background image data.

Furthermore, the presence detection of the stopping vehicle during night is performed by separating the measuring area in the current image data into left and right halves and measuring frequency values of luminance at respective levels.

With the construction set forth above, the following effect can be achieved.

First of all, presence detection of a stopping vehicle can be output in a traffic jam during daytime and so forth. Secondly, it is enable to count of the number of vehicles even for stopped vehicles turning on only small lamps during nighttime.

It is a still further object of the present invention to provide an advanced vehicle activity measuring apparatus which can accurately measure and collect necessary traffic information, such as vehicle speeds, number of passing vehicles, types of the vehicles (small size vehicles/large size vehicles) and so forth, while avoiding influence of reflected head lights reflected from the road surface in the rain during nighttime.

In order to accomplish the above-mentioned object, influence of the reflected head lights in the rain in the night is avoided by employing a threshold value derived on the basis of an average luminance at respective lanes.

In addition, the present invention also enables detection of the small lamps and so forth by employing a simplified coordinate conversion for correcting offset of the imaging angle only in the vertical direction.

With the construction set forth above, the present invention can avoid influence of the reflected head lights reflected from the road surface in the rain during nighttime, and thus an accurate measurement of the vehicle is obtained.

Secondly, the apparatus is enabled to detect not only head lights but also small lamps so accurate measurement of the vehicle can be assured.

DESCRIPTION OF THE PREFERRED EMBODIMENTS

Several embodiments of the present invention will be discussed herebelow in detail with reference to the accompanying drawings.

Figure 1:
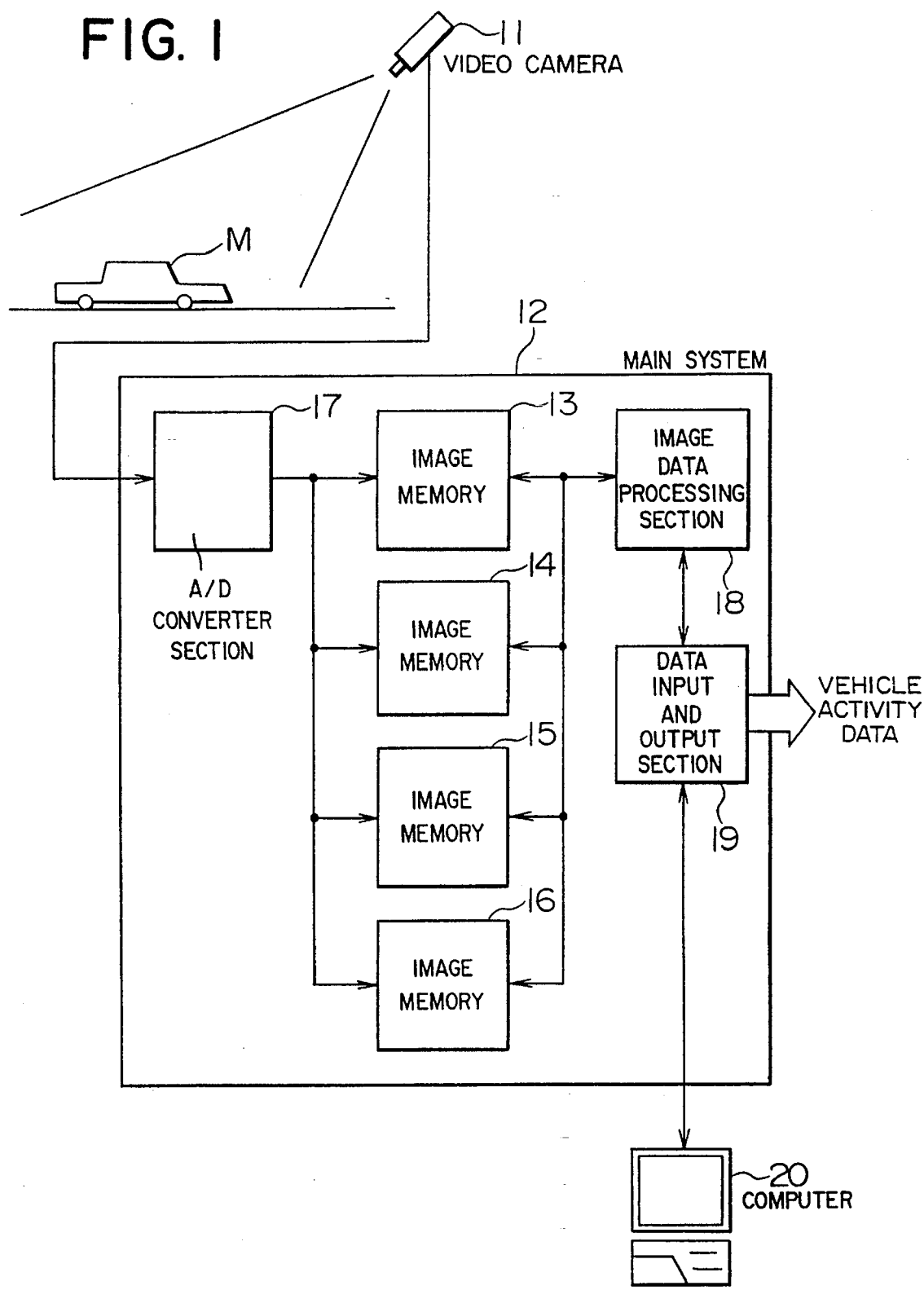
FIG. 1 is a block diagram of a first embodiment of a vehicle activity measuring apparatus according to the present invention.

FIG. 1 shows a first embodiment of a vehicle activity measuring apparatus according to the present invention.

In FIG. 1, the reference numeral 11 denotes a video camera, 12 denotes a main system of the vehicle activity measuring apparatus, 13 denotes an image memory (input image 1), 14 denotes an image memory (input image 2), 15 denotes an image memory (input image 3), 16 denotes an image memory (input image 4), 17 denotes an A/D converter section, 18 denotes an image data processing section, 19 denotes a data input and output section and 20 denotes a computer.

The operation of the first embodiment of the vehicle activity measuring system will be discussed herebelow.

In the foregoing construction of the first embodiment, an image of a vehicle M on the road is picked up by a video camera 11 for transferring an image information (signal) to the main system 12 of the vehicle activity measuring apparatus.

In the main system 12 of the vehicle activity measuring apparatus, the supplied image information is converted into digital data (signal) by the A/D converter 17.

Then, digital data for two frames of images respectively picked up and having a given interval is stored in the image memories 13 and 14. On the other hand, in the image memory 15, background image data of the background image of the measuring area having no vehicle is stored.

With the data in the image memories 13, 14 and 15, the image data processing section 18 performs image processing. The result of image processing is written in the image memory 16. Extraction of the vehicle image is performed with respect to the resultant data stored in the image memory 16. By continuously performing extraction of the vehicle image, tracing of the vehicle is performed for measuring the traveling speed and so forth to output a vehicle activity data to the data input and output section 19. Based on this, the current condition of the road is discriminated to perform updating of the background data based thereon.

On the other hand, the image data stored in the image memory 16 is transferred to the computer 20 which is connected to the input and output section 19. The computer 20 performs detailed analysis for the vehicle activity data. Next, discussion will be given for process for storing the vehicle information.

Figure 2:
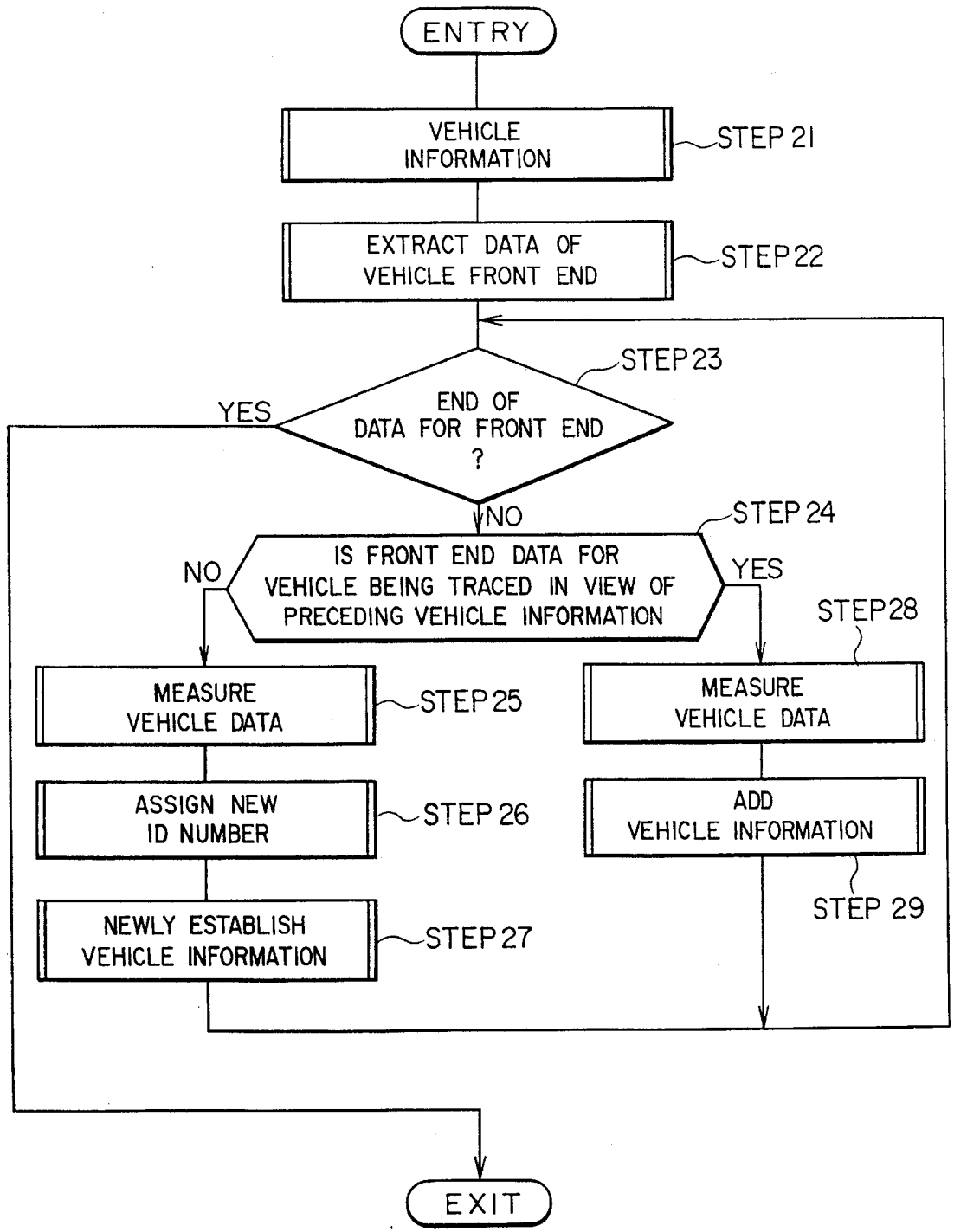
FIG. 2 is a flowchart showing a process for storing vehicle information in the first embodiment.

FIG. 2 shows a flow diagram for processing vehicle information.

At first, using the image data in the image memory, the vehicle image is extracted through derivation of a difference between frames, a difference between the vehicle image data and the background data and differentiation thereof (step 21).

Then, by the extracted vehicle data, extraction is performed for determining the position of the front end of the vehicle (step 22). Subsequently, the extracted front end position is compared with the preceding vehicle information up to the immediate preceding cycle to determine whether the data is for a vehicle already being traced (step 24).

If the vehicle is determined to be a new vehicle and thus the answer at the step 24 is negative, measurement of the front end position of the vehicle in the measuring zone, a width of the vehicle, and positions of both ends of the vehicle are measured (step 25). Then, a new ID number is assigned for the newly detected vehicle (step 26). A memory area is then established at an address identified by the ID number for storing vehicle information obtained through the process of the step 25 (step 27).

On the other hand, when a determination is made at the step 24 that the vehicle has already been traced and thus the answer is positive, at first, measurement of the result of current tracing is performed (step 28). The resultant data is then added to the memory area identified by the ID number given to the traced vehicle as the vehicle information (step 29). The foregoing processes are performed with respect to all detected front ends (step 23).

Thus, the vehicle information can be stored in time sequence in the memories. This data is also transferred to the computer 20. The computer performs analysis in detail for vehicle activity.

On the other hand, even when extraction of the vehicle image temporarily fails, measurement for the vehicle can be continued by predicting vehicle activities on the basis of the above-mentioned data.

Next, discussion will be given for a process for calculating the vehicle speed from the above-mentioned vehicle activity data.

Figure 3:
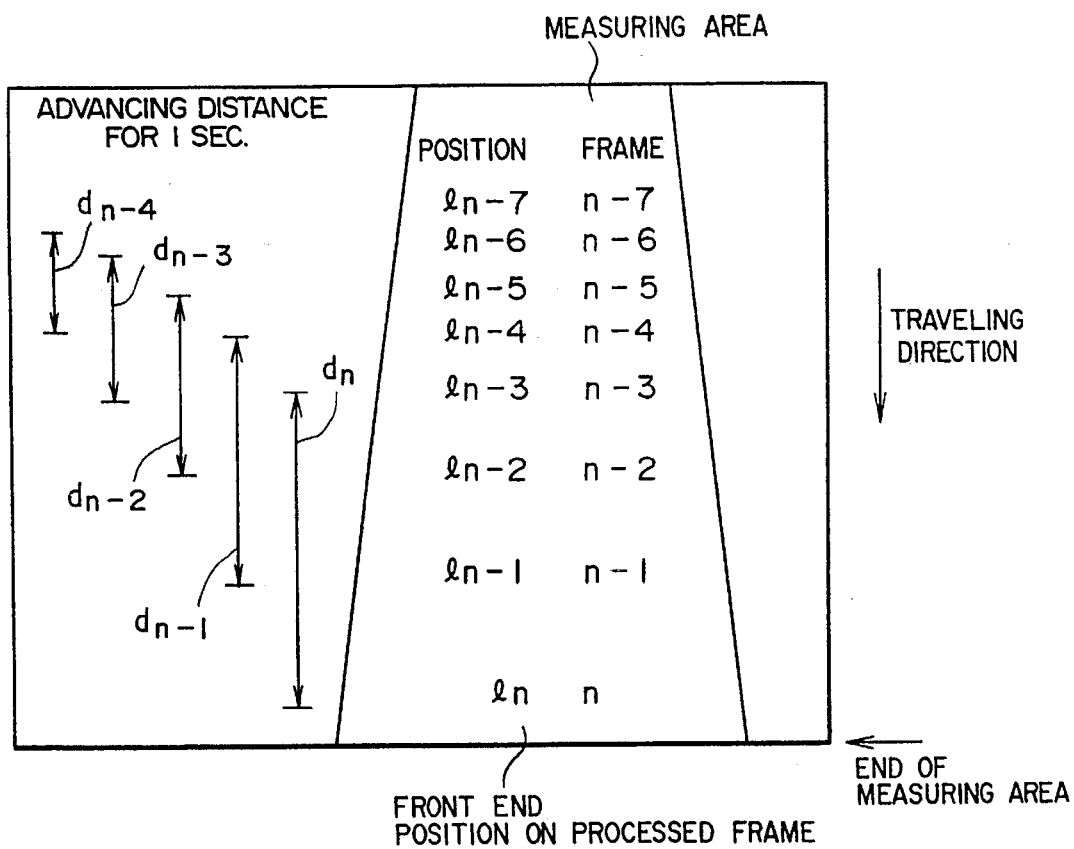
FIG. 3 is an explanatory chart showing amount of movement of a front end as a result of a process which is used for discussion of the operation of the first embodiment.

FIG. 3 shows an amount of movement of the front end as a result of this process. Here, it is assumed that this process is performed for three frames per one second.

In FIG. 3, n, n-1, n-2, . . . n-7 represent processed frame numbers, $l_n'$, $l_{n-1}'$, $l_{n-2}'$, . . . $l_{n-7}$ represent distances from a measurement termination area to the front end of the vehicle, $d_n$, $d_{n-1}$, $d_{n-2}$, $d_{n-3}$, $d_{n-4}$ represent traveling distances of the front end of the vehicle in respective one second periods. At first, in the case of the processed frame n, the traveling distance $d_n$ over one second can be expressed by the following equation (1):

$$d_n = l_{n-1} - l_n \qquad (1)$$

Accordingly, the instantaneous vehicle speed $v_n$ can be expressed by the following equation (2):

$$V_n[km/h] = d_n[m]/(1[sec])*3.6 \qquad (2)$$

Vehicle speed calculation is performed with respect to the processed frames n-1, n-2, n-3 and n-4 using the traveling distances $d_n$, $d_{n-1}$, $d_{n-2}$, $d_{n-3}$, $d_{n-4}$, to derive respective instantaneous vehicle speeds $v_n$, $v_{n-1}$, $v_{n-2}$, $v_{n-3}$, $v_{n-4}$. With these calculated vehicle speeds, the vehicle speed (the weighted average speed) v at the image frame n can be expressed by the following equation (3):

$$\underline{v}[km/h] = (8V_n + 4V_{n-1} + 2V_{n-2} + V_{n-3} + V_{n-4})/16 \qquad (3)$$

By averaging after providing weights for respective speeds, the instantaneous vehicle speed v at the frame n can be derived.

Next, discussion will be given for the process for calculating the vehicle speed based on the stored vehicle information.

Figure 4:
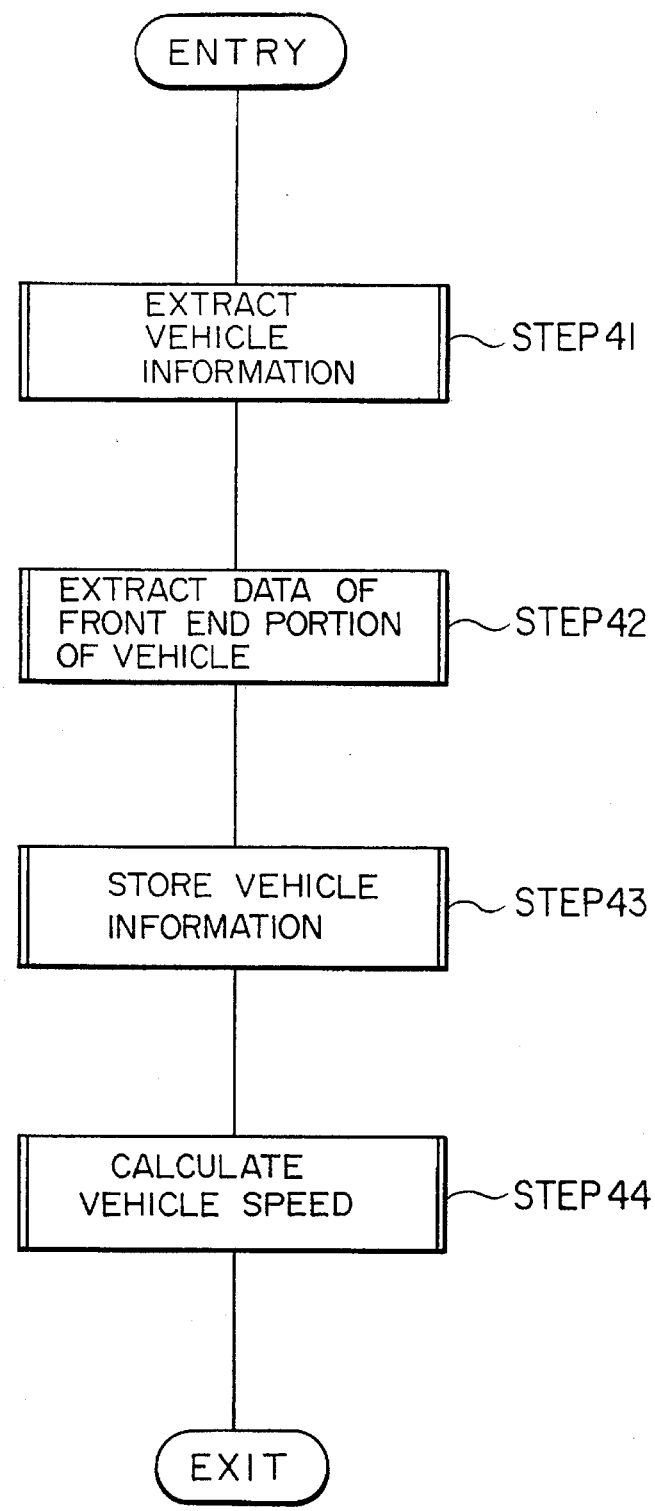
FIG. 4 is a flowchart showing a process of calculation of the vehicle speed in the first embodiment.

FIG. 4 shows a flow diagram of the process of vehicle speed calculation.

At first, using the image data on the image memory, the vehicle image is extracted by calculating the difference between frames and the difference between the frame and the background, differentiation thereof and so forth (step 41). Then, based on the vehicle extraction data, the front end position of the vehicle is extracted (step 42). Subsequently, the above-mentioned vehicle information storing process is performed (step 43) to store the results of tracing (the position of the front end of the vehicle in the measuring area, the vehicle width, and both end positions of the vehicle) as the vehicle information. Then, with respect to each of the traced vehicles, calculation of the vehicle speed is performed (step 44).

Through the process set forth above, even when an offset is temporarily caused in the extracted vehicle front end relative to the actual position, influence of the offset for measurement of the speed is minimized to allow accurate tracing and measuring process. Furthermore, discussion will be given for predictive tracing of the vehicle through calculation of the vehicle speed based on the stored vehicle information.

Figure 5:
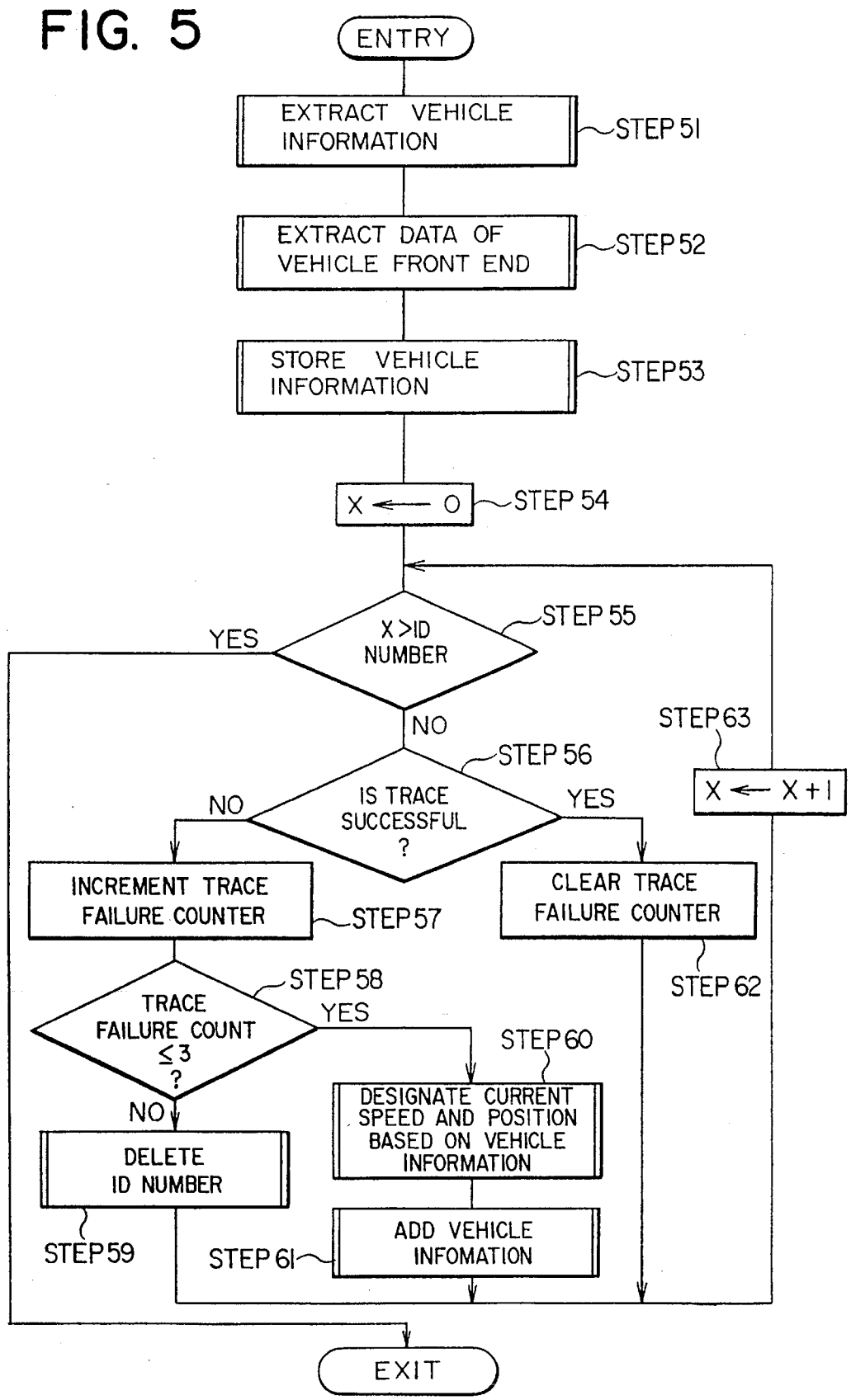
FIG. 5 is a flowchart showing a process of tracing of vehicle with prediction in the first embodiment.

FIG. 5 shows a flow diagram of the process of the predictive tracing for the vehicle.

At first, using the image data in the image memory, the vehicle image is extracted through a process for calculation of the differences between frames and between the frame and the background, differentiation thereof and so forth (step 51). Then, based on the extracted vehicle data, the front end position of the vehicle is extracted (step 52).

Then, the foregoing vehicle information storing process is performed (step 53) to store results of tracing, namely the front end position for the vehicle in the measuring area, the vehicle width, both end positions of the vehicle, as the vehicle information. Then, a check is performed for whether the tracing of the vehicle in the current cycle is successful, namely whether the front end of the vehicle is successfully extracted (step 56). When tracing has failed and thus the answer at the step 56 is negative, a trace failure counter stored in the vehicle information with the corresponding ID number is incremented by 1 (step 57). Thereafter, a check is performed whether consecutive occurrences of failure of tracing of the measuring vehicle is less than or equal to three (step 58). If the occurrences of fault extraction are less than or equal to three and thus the answer at the step 58 is positive, then the current position and speed are predicted on the basis of the vehicle information (vehicle position data) stored in the cycles up to the immediately preceding cycle and the vehicle speed calculated through the foregoing vehicle speed calculation (step 60). The predicted position and speed of the vehicle are added to the memory area identified by the ID number of the traced vehicle (step 61). If failure of extraction occurs consecutively four times and thus the answer at the step 58 becomes negative, memory area is cleared and corresponding ID number is deleted (step 59).

On the other hand, when tracing in the current cycle is successful and the answer at the step 56 is positive, the trace failure counter is cleared (step 62). These processes are performed with respect to all vehicles for which the ID numbers are assigned (steps 54, 55, 63).

Through the process set forth above, tracing the vehicle and measurement of the vehicle information therefor can be continued even when extraction of the vehicle has temporarily failed.

Furthermore, by allowing continuation of tracing and measuring without interruption, the vehicle activity data through more accurate vehicle information measurement and collection can be obtained.

As should be clear from the foregoing discussion for the first embodiment, the present invention assigns an identification number for each of the vehicles to be traced, and stores the results of tracing, i.e., the position of the vehicle within the measuring area, the vehicle speed, its acceleration, both end position of the vehicle, and so on, as vehicle information in a time sequential manner. Therefore, the computer which receives the stored data can perform more detailed analysis for the vehicle activity.

On the other hand, since the accurate speed is derived by calculating the speed over one second periods for respective processing image frames on the basis of position information in several preceding frames, weighting the calculated speed and then averaging, even when the vehicle extraction based on the stored data has temporarily failed, measurement for the vehicle can be continued by prediction of the vehicle activity by the computer. Furthermore, even when the extracted front end of the vehicle is temporarily offset from the actual position, the influence of the offset for measurement of the speed can be minimized by the computer and thus accurate tracing and measurement are performed. Furthermore, even when temporary failure is caused in extraction of the vehicle, tracing and measurement for the vehicle can be continued without interruption, and more accurate measurement and collection of the vehicle information becomes possible.

Another embodiment of the present invention will be discussed herebelow in detail with reference to the accompanying drawings.

Figure 6:
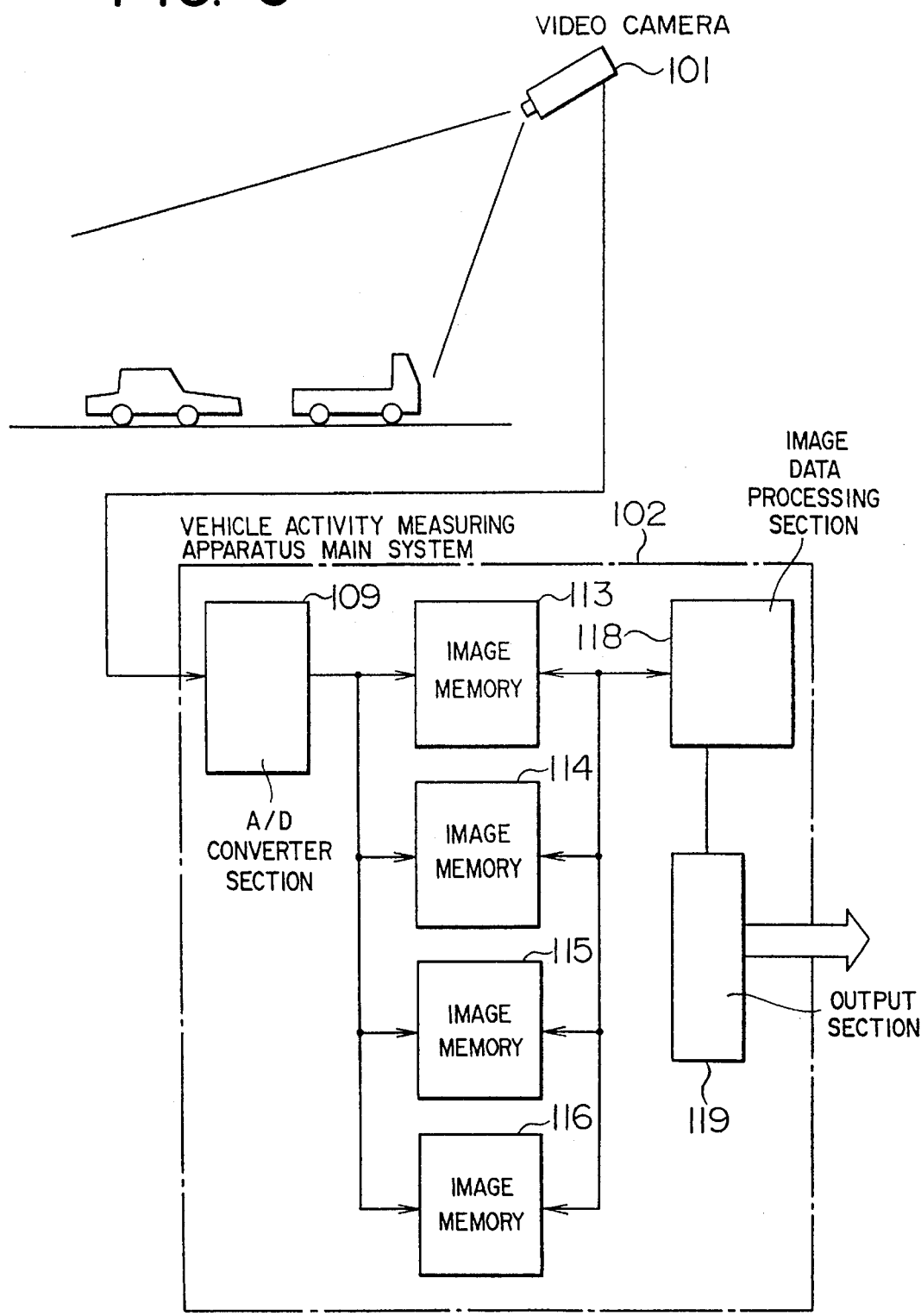
FIG. 6 is a block diagram of a second embodiment of the vehicle activity measuring apparatus according to the present invention.

FIG. 6 shows a second embodiment of a vehicle activity measuring apparatus according to the present invention.

In FIG. 6, the reference numeral 101 denotes a video camera, and 102 denotes a main system of the vehicle activity measuring apparatus. In the main system 102 of the vehicle activity measuring apparatus, the reference numeral 109 denotes an A/D converter section, 113 denotes an image memory (input image 1), 114 denotes an image memory (input image 2), 115 denotes an image memory (input image 3), 116 denotes an image memory (input image 4), 118 denotes an image data processing section, and 119 denotes a data output section.

The operation of the second embodiment of the vehicle activity measuring system will be discussed herebelow.

In the foregoing construction of the second embodiment, an image of a vehicle on the road is picked up by video camera 101 to transfer an image information (signal) to the main system 102 of the vehicle activity measuring apparatus.

In the main system 102 of the vehicle activity measuring apparatus, the supplied image information is converted into digital data (signal) by the A/D converter 109. Then, digital data for two frames of images respectively picked up and having a given interval is stored in the image memories 113 and 114. On the other hand, background image data of the measuring area in which the vehicle does not exist, is stored in image memory 115.

With the data in the image memories 113, 114 and 115, the image data processing section 118 performs image processing. The result of image processing is written in the image memory 116. Based on the written image data in image memory 116, extraction of the vehicle image is performed and the types of the vehicles are classified into three types, i.e., large size vehicles, small size vehicles and parts of the vehicles.

Based on these results, a traveling position of the vehicle is determined. By repeating this process, vehicle trace, vehicle speed and so forth are output through the data output section 119. Also, the instantaneous road condition is discriminated to update the background data based on this information.

FIGS. 7A to 7D show the traveling positions of the vehicle.

Here, offset from the center is indicated that the offset is 0% at the center of a lane, the offset is −100% at the left side edge of the lane, and the offset is +100% at the right side edge of the lane. A left side zone is set in a range of offset from −100% to −x %, a center zone is set in a range of offset from −x % to +x %, and a right side zone is set in a range of offset from +x % to +100%.

Figure 7A:
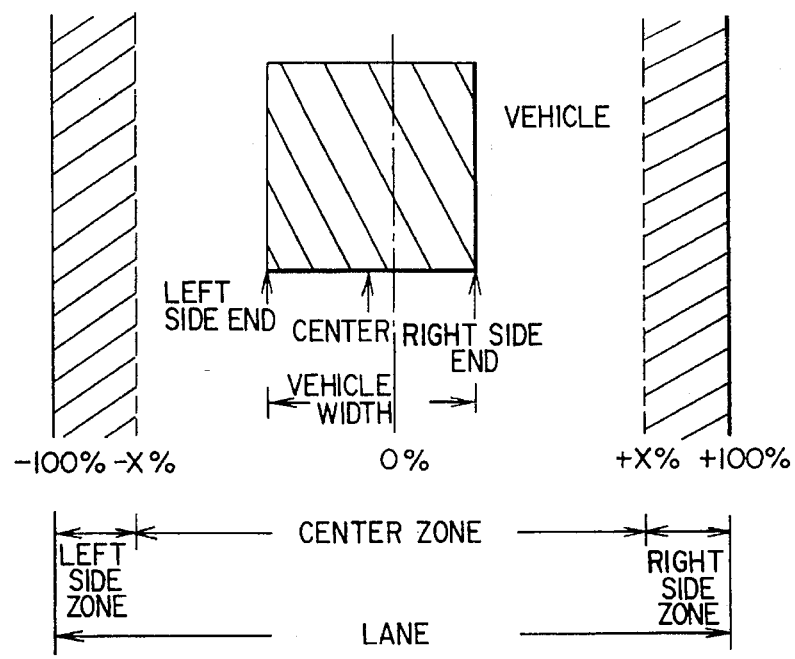
FIG. 7A is an illustration explaining a vehicle traveling on a lane.

FIG. 7A shows a small size vehicle traveling at a normal position in the lane. In this case, both side ends of the vehicle are present in the center zone and the vehicle width is sufficient to lead to a judgment for a single small size vehicle.

Figure 7B:
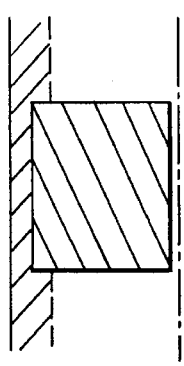
FIG. 7B is an illustration indicating the vehicle traveling leftwardly offset in the lane.

FIG. 7B shows a small size vehicle traveling in a position leftwardly offset in the lane. In this case, the left side end of the vehicle is present in the left side zone and the vehicle width in the lane is sufficient for leading to a judgment for a single small size vehicle.

Figure 7C:
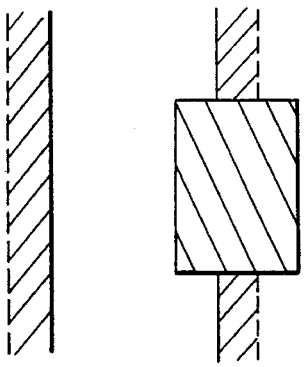
FIG. 7C is an illustration indicating the vehicle traveling extended to the next left side lane.

FIG. 7C shows a small size vehicle traveling in a position leftwardly offset over the left side edge and extending into the next left side lane. In this case, the left side end of the vehicle is judged to be present in the left side zone and the vehicle width is insufficient for leading to a judgment for a single small size vehicle.

Figure 7D:
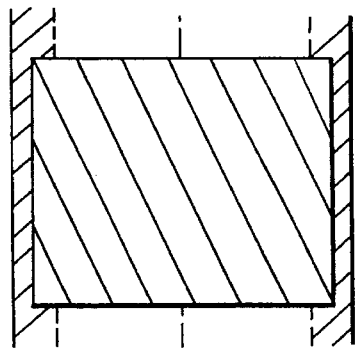
FIG. 7D is an illustration of a large size vehicle traveling in the lane.

FIG. 7D shows a large size vehicle traveling in the lane. In this case, the left side end of the vehicle is present in the left side zone and the right side end of the vehicle is present in the right side zone. The vehicle width is sufficient for leading to a judgment for a single large size vehicle.

Next, discussion will be given for determination of traveling position of the vehicle in the lane.

Figure 8:
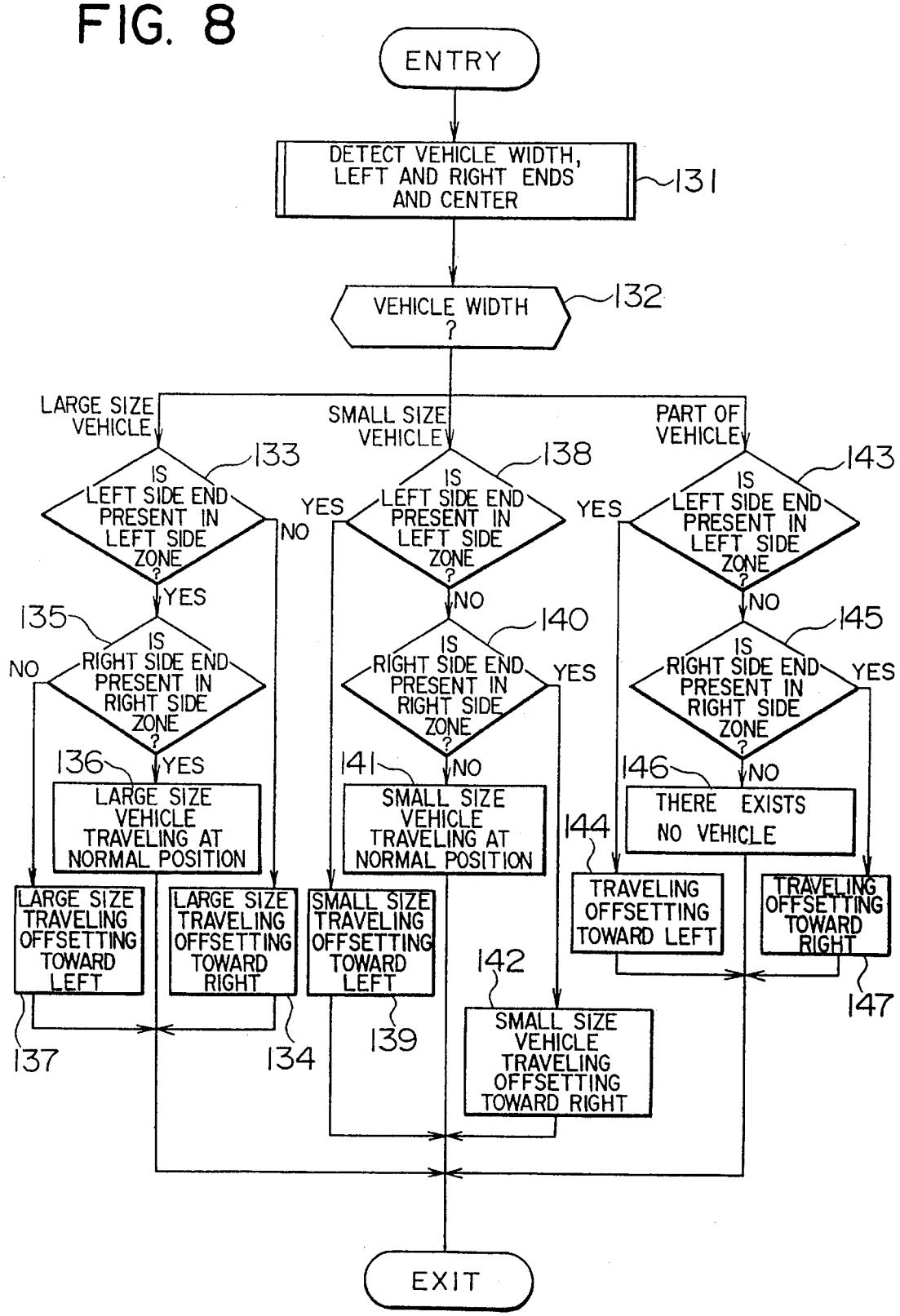
FIG. 8 is a flowchart showing a process of determination of a traveling vehicle in a lane in the second embodiment.

FIG. 8 is a flowchart showing process for determining the traveling position of the traveling vehicle within the lane.

At first, the image data is processed through a differentiation process, calculation of a difference between the image data and background data and so forth, to extract the vehicle image and then to derive the vehicle width, left and right side ends and center (step 131). Then, the vehicle width is classified against the three types, i.e., the large size vehicle, the small size vehicle and the part of the vehicle (step 132). When the vehicle is classified as a large size vehicle, a check is performed to determine whether the left side end of the vehicle is present in the left side zone (step 133). If the left side end is not present in the left side zone and thus the answer at the step 133 is negative, then a judgment is made that the vehicle is traveling offset toward the right (step 134). On the other hand, if the left side end of the vehicle is present in the left side zone, a check is performed to determine whether the right side end of the vehicle is present in the right side zone (step 135). When the right side end of the vehicle is not present in the right side zone, the answer at the step 135 is negative, and a judgement is made that the vehicle is traveling offset toward the left (step 137). On the other hand, when both side ends are present with respect to the left and right side zones, then a judgment is made that the vehicle is traveling at the normal position (step 136).

When the vehicle is classified as a small size vehicle at the step 132, checks are performed for determining whether the left side end is present within the left side zone and whether the right side end is present within the right side zone (steps 138, 140). In the case that both side ends of the vehicle are present in the center zone and thus the answers at both steps 138 and 140 are negative, a judgment is made that the vehicle is traveling at the normal position (step 141). On the other hand, when the left side end of the vehicle is present in the left side zone and thus the answer at the step 138 is positive, and a judgment is made that the small size vehicle is traveling offset toward left (step 139). When the right side end of the vehicle is present in the right side zone and thus the answer at the step 140 is positive, then a judgment is made that the small size vehicle is traveling offset toward right (step 142).

When the vehicle is classified as a part of the vehicle, checks are performed to determine whether the left side end is present in the left side zone and whether the right side end is present in the right side zone (steps 143, 145). When only the left side end is present in the left side zone and thus the answer at the step 143 is positive, a judgment is made that the part of the vehicle is traveling offset toward the left. When only the right side end is present in the right side zone and thus the answer at the step 145 is positive, a judgment is made that the part of the vehicle is traveling offset toward the right. On the other hand, when both ends are present in the center zone and thus the answers at both steps 143 and 145 are negative, judgment is made that what is detected is not a part of vehicle.

Through the process set forth above, by measuring and tracing the traveling position of the vehicle within the lane, a judgment can be made whether a vehicle performs a lane change. Furthermore, depending upon the position of a large size vehicle, a judgment can be made whether the vehicle may influence for the adjacent lane in terms of the imaging angle.

Figure 9:
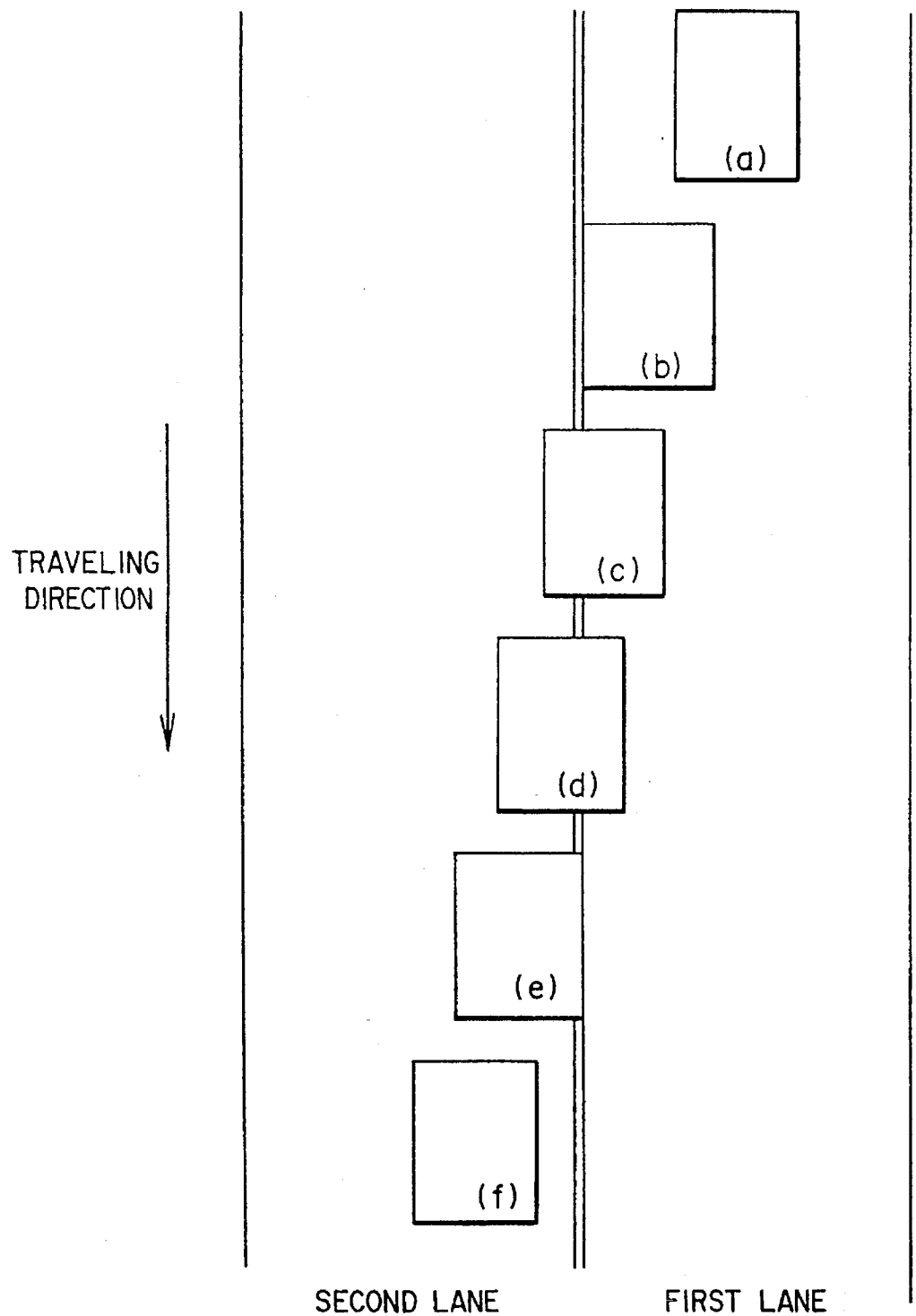
FIG. 9 is an explanatory illustration showing vehicle activity upon performing a lane change, which is used for discussion of the operation of the second embodiment.

Next, FIG. 9 shows the activity of the vehicle which performs a lane change from a first lane to a second lane.

In FIG. 9, when the above-mentioned determination of the traveling position of the vehicle within the lane is used, the activity leads to sequential judgments that (a) a small size vehicle travels at the normal position in the first lane; (b) the small size vehicle travels at leftwardly offset position in the first lane; (c) and (d) a part of the vehicle travels in both of the first and second lanes; (e) the small size vehicle travels at the rightwardly offset position in the second lane; and (f) the small size vehicle travels in the normal position in the second lane. In case of (c) and (d), since measurements of the vehicle widths are performed with respect to the respective lanes and comparison is performed to judge on which lane the greater width of the vehicle is present, a judgment is made that in (c), the vehicle travels on the first lane, and in (d), the vehicle travels on the second lane. Next, discussion will be given for a tracing following the lane change of the vehicle.

Figure 10:
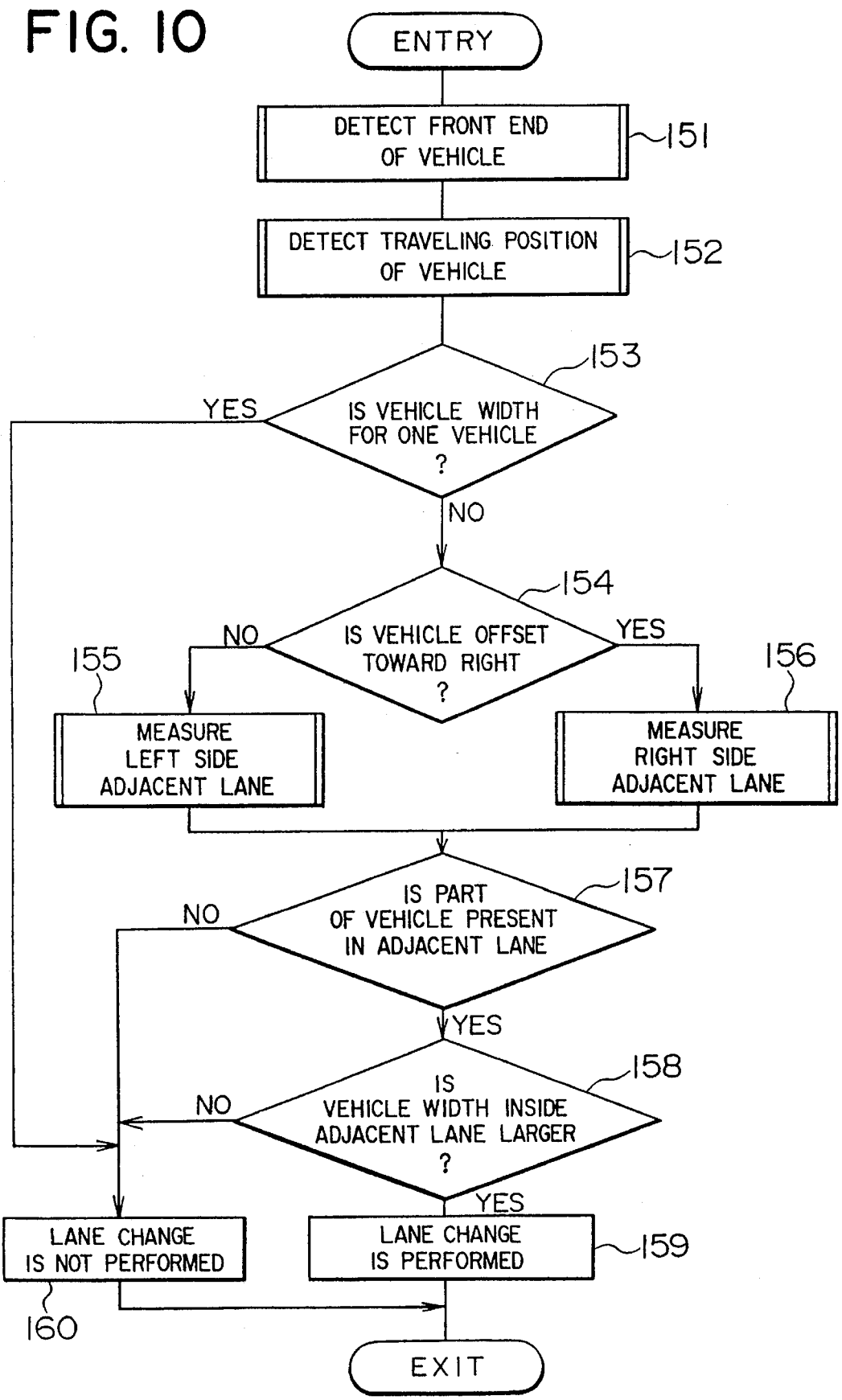
FIG. 10 is a flowchart showing a process for tracing and following upon occurrence of lane change of the vehicle.

FIG. 10 shows a flowchart showing a process for a tracing following a lane change of the vehicle. At first, detection of the front end of the vehicle is performed (step 151). Then, detection of the traveling position is performed through the following process (step 152).

At first, a comparison is made for the vehicle width to make a judgment whether the width is greater than or equal to a single vehicle (step 153). When a judgment is made that the vehicle width is for one vehicle and thus the answer at the step 153 is positive, a judgment is made that a lane change is not performed (step 160). If a vehicle width is less than one vehicle, a check is performed to determine whether the vehicle is offset toward the right or left (step 154). If the vehicle is offset toward the left and thus the answer at the step 154 is negative, or if the vehicle is in offset toward right and thus the answer at the step 154 is positive, a measurement is performed around the position where the front end of the vehicle is presently located (steps 155, 156), then a check is performed to determine whether the vehicle is present at a rightwardly offset position in the left hand adjacent lane or is present at a leftwardly offset position in the right hand adjacent lane (step 157). When the vehicle is present in an offset position in a corresponding direction in the adjacent lane and thus the answer at the step 157 is positive, the vehicle widths at respective lanes are compared (step 158). Then, when the vehicle width in the adjacent lane becomes greater and thus the answer at the step 158 becomes positive, a judgment is made that a lane change has been performed (step 159). In the next process for tracing of the vehicle, tracing and measurement process for the vehicle which made a lane change is performed with respect to the lane to which the vehicle has moved.

Through the process set forth above, since tracing of the vehicle can be continued following a vehicle even when the vehicle makes a lane change, it becomes possible to perform a measurement for the vehicle for a longer distance. Also, it allows measurement of vehicle activities for dilemma control over multiple lanes and so forth.

Figure 11:
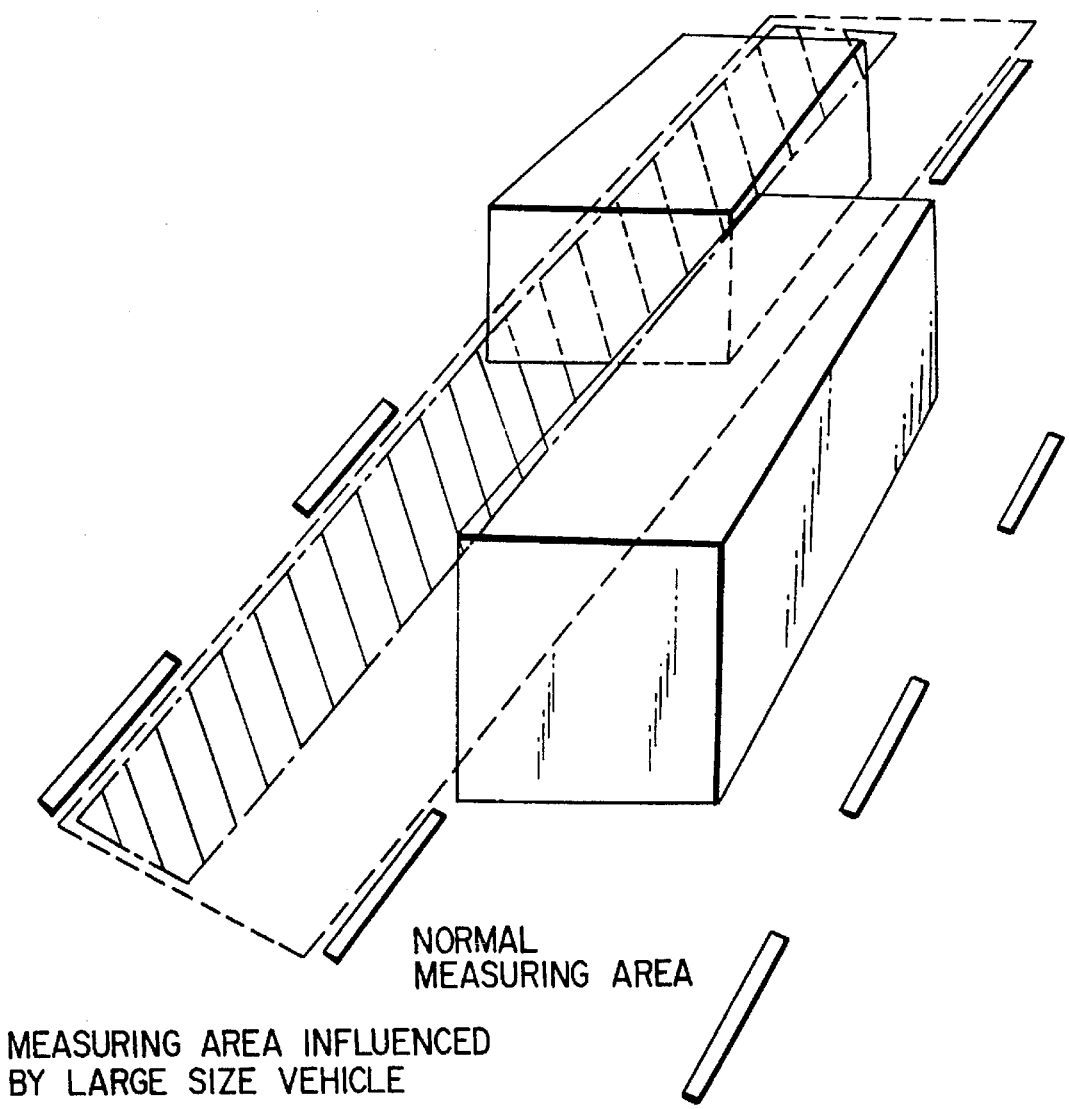
FIG. 11 is an explanatory illustration to be used for discussion of the operation of the second embodiment and showing influence of a large size vehicle for the adjacent lane.

FIG. 11 shows an influence on measurement for the adjacent lane by a large size vehicle.

As can be understood from this figure, depending upon the installation condition of the video camera, when the large size vehicle travels in a position offset toward the left, approximately half of the left adjacent lane becomes blind and leads to an erroneous detection of the large size vehicle as a vehicle in the left adjacent lane or a misdetection of a vehicle hidden by the large size vehicle. Accordingly, in the normal case, a measurement is performed by setting a measurement area along the lane, however, when a judgment is made that a large size vehicle in the right adjacent lane is traveling in a position offset toward the left, only a left half of the normally used measuring area is used for measurement.

Next, a discussion will be given for a method for removing influence of a measurement when a large size vehicle travels in the adjacent lane.

Figure 12:
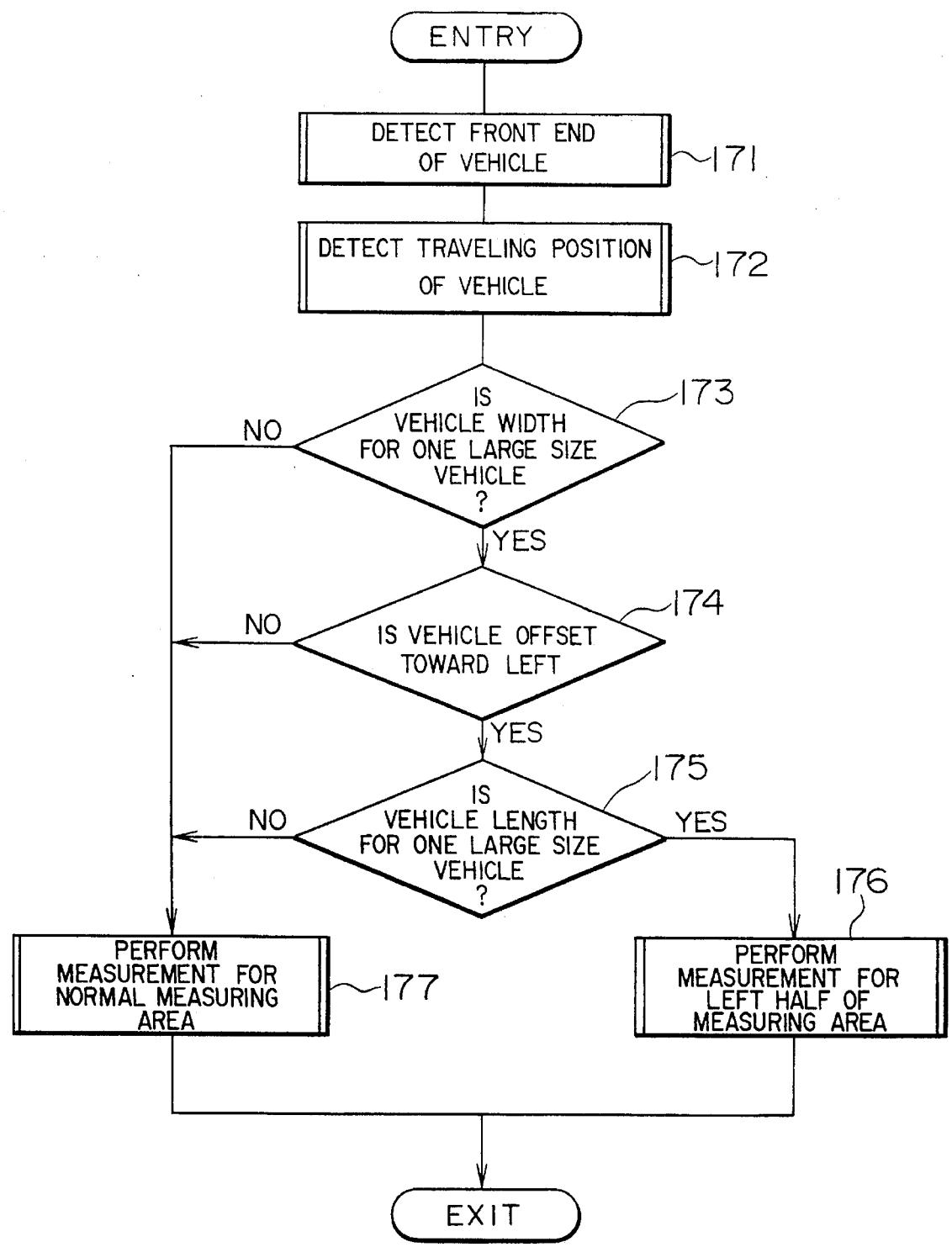
FIG. 12 is a flowchart showing a process of eliminating an influence on measurement for the adjacent lane by the large size vehicle.

FIG. 12 is a flowchart showing a process for removing influence of a measurement when a large vehicle travels in the adjacent lane.

At first, detection of the front end of the vehicle is performed (step 171). Then, using the same process as in the first embodiment for detecting the traveling position of the vehicle, the traveling position of the vehicle is detected (step 172). Thereafter, a comparison is made with respect to the vehicle width to check whether the vehicle width for one large size vehicle is present in the lane (step 173). If a judgment is made that the vehicle width for one large size vehicle is present and thus the answer at the step 173 is positive, a check is performed to determine whether the traveling position of the vehicle is offset toward the left or right (step 174). If the vehicle is offset toward the left and thus the answer at the step 174 is positive, a check is performed regarding the length of the vehicle to determine whether the length is for one large size vehicle present in the lane (step 175). If the vehicle length present in the lane is for one large size vehicle and thus the answer at the step 175 is positive, extraction of the vehicle image, and tracing and measurement of the vehicle are performed using the left half of the measuring area in the adjacent lane (step 176). On the other hand, when the answer at either step 174 or 175 is negative, then extraction of the vehicle image and tracing and measurement of the vehicle are performed using the normal measuring area.

Through the process set forth above, measurement of traffic information can be done with high accuracy at any lane without any influence of a large size vehicle.

As should be clear from the foregoing embodiments, the present invention can achieve the following advantages.

By measuring and tracing the traveling position of the traveling vehicle within the lane, the measured position can be used as a condition for making a judgment whether the vehicle makes a lane change. Furthermore, the position of the vehicle may also be used as a condition for a judgment whether the adjacent lane will be influenced by the traveling position of a large size vehicle depending upon an imaging angle.

Even when the vehicle makes a lane change, it is possible to follow the vehicle to perform a measurement of the vehicle for a longer distance. Also, it allows measurement of vehicle activities for dilemma control over multiple lanes and so forth.

Measurement of traffic information can be done with high accuracy at any lane without any influence of large size vehicles.

The construction of a further embodiment of the present invention will be discussed herebelow with reference to the drawings.

Figure 13:
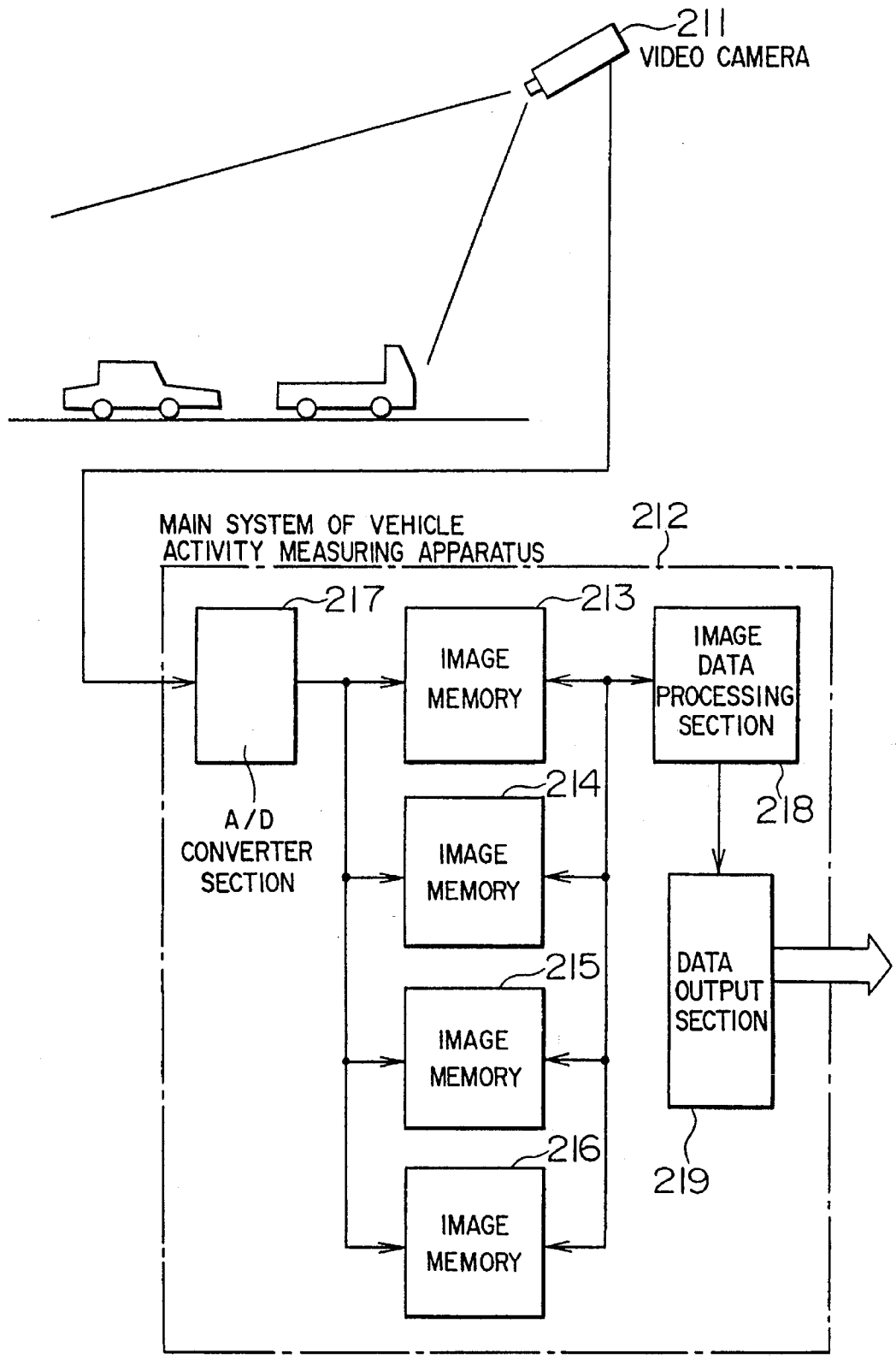
FIG. 13 is a block diagram of a third embodiment of the vehicle activity measuring apparatus according to the present invention.

FIG. 13 shows a third embodiment of a vehicle activity measuring apparatus according to the present invention.

In FIG. 13, the reference numeral 211 denotes a video camera, 212 denotes a main system of the vehicle activity measuring apparatus, 213 denotes an image memory (input image 1), 214 denotes an image memory (input image 2), 215 denotes an image memory (input image 3), 216 denotes an image memory (input image 4), 217 denotes an A/D converter section, 218 denotes an image data processing section, and 219 denotes a data output section.

The operation of the third embodiment of the vehicle activity measuring system will be discussed herebelow.

In the foregoing construction of the third embodiment, an image of a vehicle on the road is picked up by a video camera 211 for transferring an image information (signal) to the main system 212 of the vehicle activity measuring apparatus. In the main system 212 of the vehicle activity measuring apparatus, the supplied image information is converted into digital data (signal) by the A/D converter 217.

Then, digital data for two frames of images respectively picked up with a given interval is stored in the image memories 213 and 214. On the other hand, the image memory 215 stores a background image data of the image of the measuring area in which no vehicle exists. With the data in the image memories 213, 214 and 215, the image data processing section 218 performs image processing. The result of image processing is written in the image memory 216. Extraction of the vehicle image is performed with respect to the resultant data stored in the image memory 216. By continuously performing extraction of the vehicle image, tracing of the vehicle is performed for measuring the traveling speed and so forth to output a vehicle activity data to the data output section 219. The current condition on the road is discriminated to perform updating of the background data based thereon.

Next, discussion will be given for presence detection of a stopped vehicle in daytime.

Figure 14:
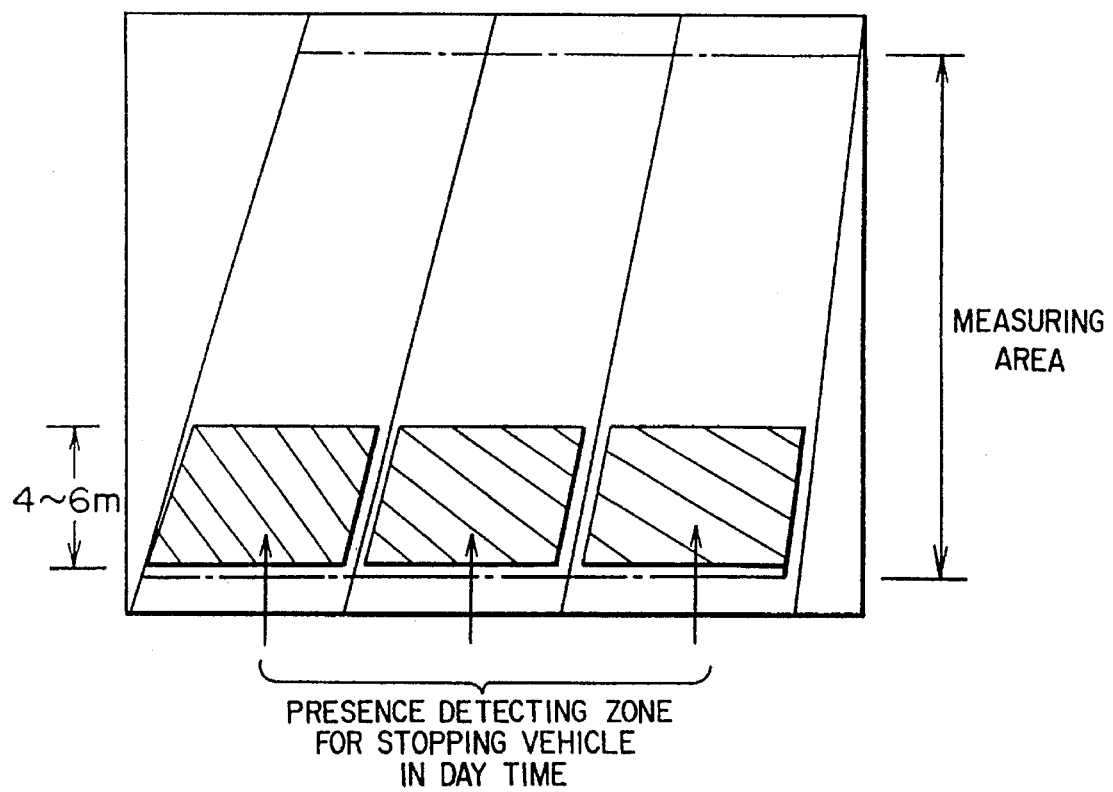
FIG. 14 is an explanatory illustration showing a measuring area for presence detection in the day time in the third embodiment.

FIG. 14 shows a measuring area for presence detection of the stopped vehicle in daytime.

As should be understood from this figure, the end zones for 4 to 6 m from the end edge of the normal measuring area are set as the zones for detection of the stopped vehicle. An average luminance and most frequently occurring value of the luminance are measured with respect to the current image data and background data of the presence detecting zone and whereby detection for the stopped vehicle in each lane in the daytime is performed.

Figure 15:
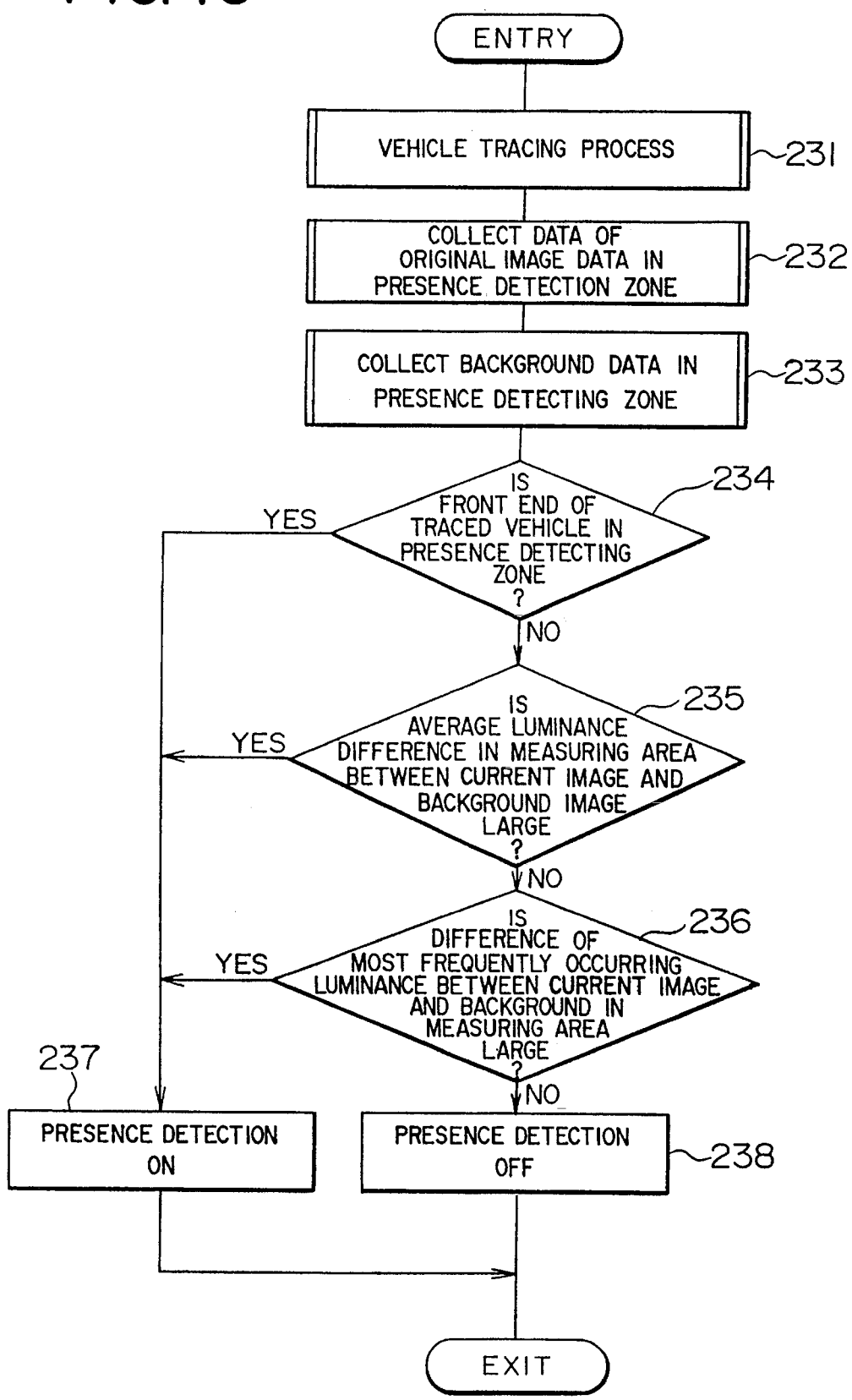
FIG. 15 is a flowchart showing a process for presence detection in the day time in the third embodiment.

FIG. 15 is a flowchart showing a process for presence detection of a stopped vehicle in daytime.

At first, normal tracing for the vehicle is performed (step 231). Then, measurement for an average luminance and a most frequently occurring data of luminance is performed with respect to the current image data for the present detecting zone (step 232). Furthermore, an average luminance and a most frequently occurring data of the luminance is measured with respect to the background data in the presence detecting zone (step 233).

Then, with respect to the traced vehicle, a judgment is made to determine whether the front end of the traced vehicle is present in the presence detecting zone (step 234). If the front end of the traced vehicle is present in the presence detecting zone and thus the answer at step 234 is positive, a presence detection output is unconditionally set to ON (step 237).

Then, if the front end of the traced vehicle is not in the presence detecting zone, a check is performed with respect to a difference of an average luminance between the current image data and the background data in the presence detecting zone (step 235). When an average luminance difference greater than or equal to a predetermined value is detected and thus the answer at step 235 is positive, the presence detection output is set to ON. On the other hand, when an average luminance difference is less than the predetermined value and thus the answer at step 235 is negative, a comparison is made for the most frequently occurring data of the luminance in the current image data and the background data in the presence detecting zone (step 236).

When a difference of the most frequently occurring data of the current image data and the background image data is greater than or equal to a predetermined value, the presence detection output is set to ON (step 237), and when the difference is smaller than the predetermined value, the presence detection output is set to OFF (step 238).

Through the process set forth above, the presence of stopped vehicles in a traffic jam during daytime can be detected. Therefore, it becomes possible to obtain the output equivalent to ultrasonic detectors employed in a traffic control system and thus facilitate establishment of the traffic control system.

Next, discussion will be given for presence detection for a stopped vehicle during nighttime.

Figure 16:
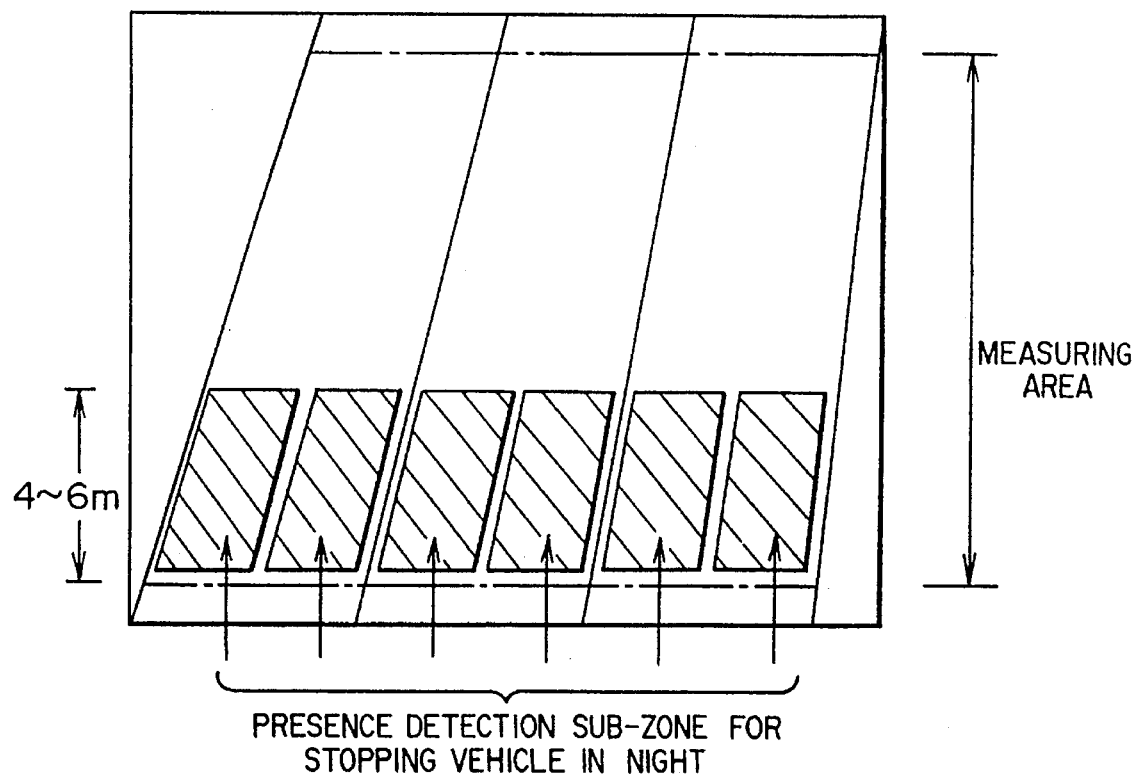
FIG. 16 is an explanatory illustration showing a measuring area for presence detection in the nighttime.

FIG. 16 shows zones in the measuring area for detecting presence of a stopped vehicle during nighttime.

As should be understood from this figure, the end zones of 4 to 6 m from the end edge of the measuring areas are separated into two sub-zones in each lane to serve for presence detection. With respect to each of the sub-zones, the most frequently occurring value of luminance in the current image data is measured for detecting presence of a vehicle in each lane during nighttime.

Normally, while a vehicle is not present at night, the most frequently occurring data of the luminance is substantially zero and most pixels in the sub-zone have the most frequently occurring value.

In contrast to this, when a vehicle is present in the zone with head lights or small lamps ON, though the most frequently occurring data will be held unchanged in most cases, the luminance of the head lights or small lamps has a higher luminance component in the observed distribution of the luminance than that of the most frequently occurring data. Therefore, presence detection can be performed utilizing this fact.

Figure 17:
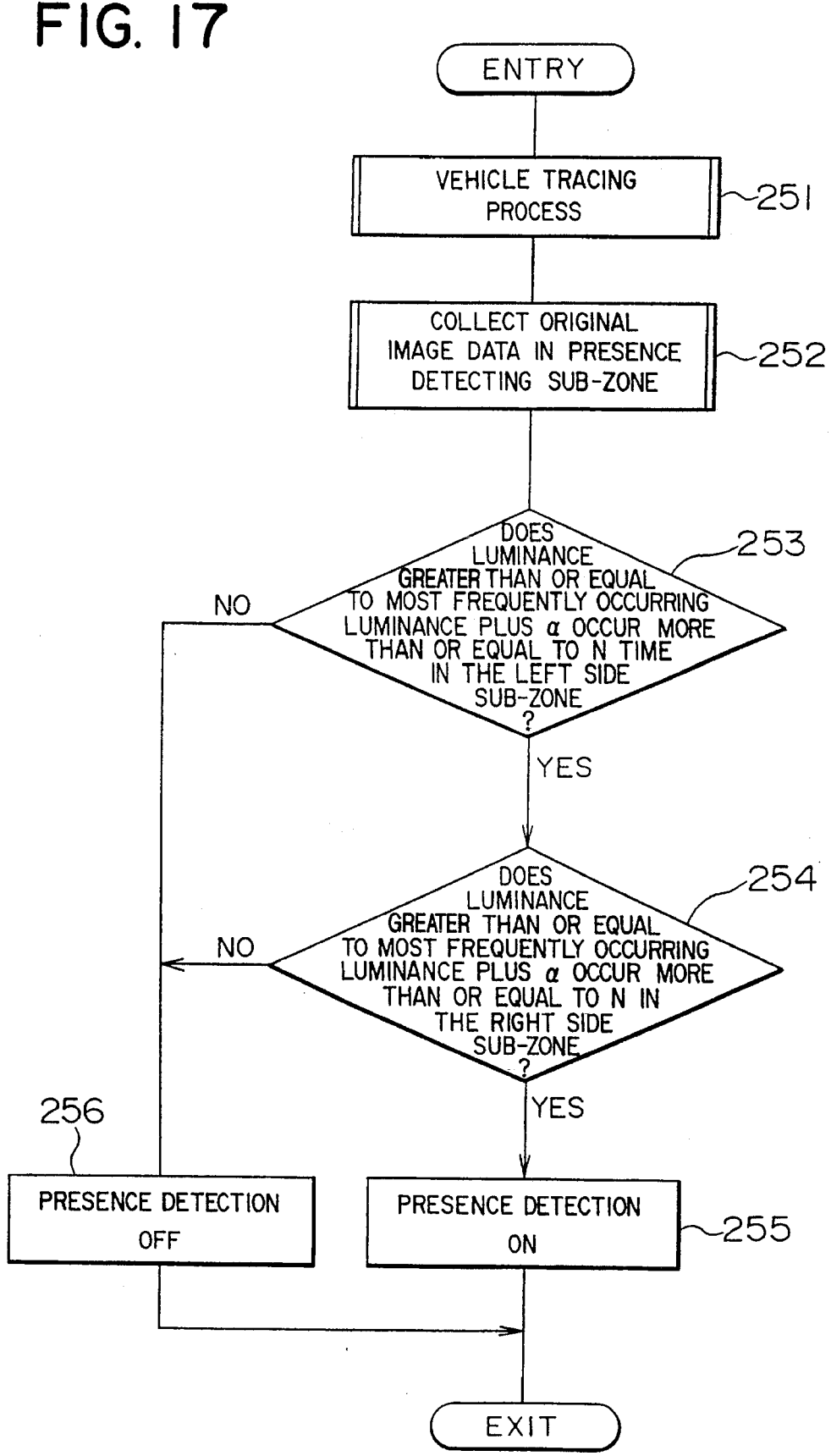
FIG. 17 is a flowchart showing a process for presence detection in the night time.

FIG. 17 shows a flowchart of a process for presence detection in the night.

At first, normal tracing for a vehicle is performed for measurement of the vehicle (step 251). Next, with respect to each of the sub-zones, the most frequently occurring luminance and the luminance distribution in the current image data is measured (step 252). At first using a threshold value established with reference to the most frequently occurring luminance at the left side sub-zone in the lane, a check is performed to determine whether the number of pixels having a luminance level higher than the threshold value is greater or equal than a predetermined number (step 253). When the answer at the step 253 is positive, a threshold value is established with reference to the most frequently occurring luminance at the right side sub-zone in the lane and a check is performed whether the number of pixels having a higher luminance level than the threshold value is greater than or equal to a predetermined number (step 254). When answers of both steps 253 and 254 are positive, the presence detection output is set to ON (step 255), or otherwise the presence detection output is set to OFF (step 256).

Through the process set forth above, even when stopped vehicles with only small lamps ON, the number of stopped vehicles can be measured and thus can serve equivalently to ultrasonic detectors employed in the traffic control system. Therefore, it facilitates establishment of the traffic control system.

As can be clear from the foregoing embodiment, the present invention can provide the following advantages.

It makes it possible to detect the presence of a stopped vehicle in a traffic jam during daytime.

It is also made possible to count the number of passing vehicles or to detect the presence of a vehicle even when only the small lamps are ON.

Figure 18:
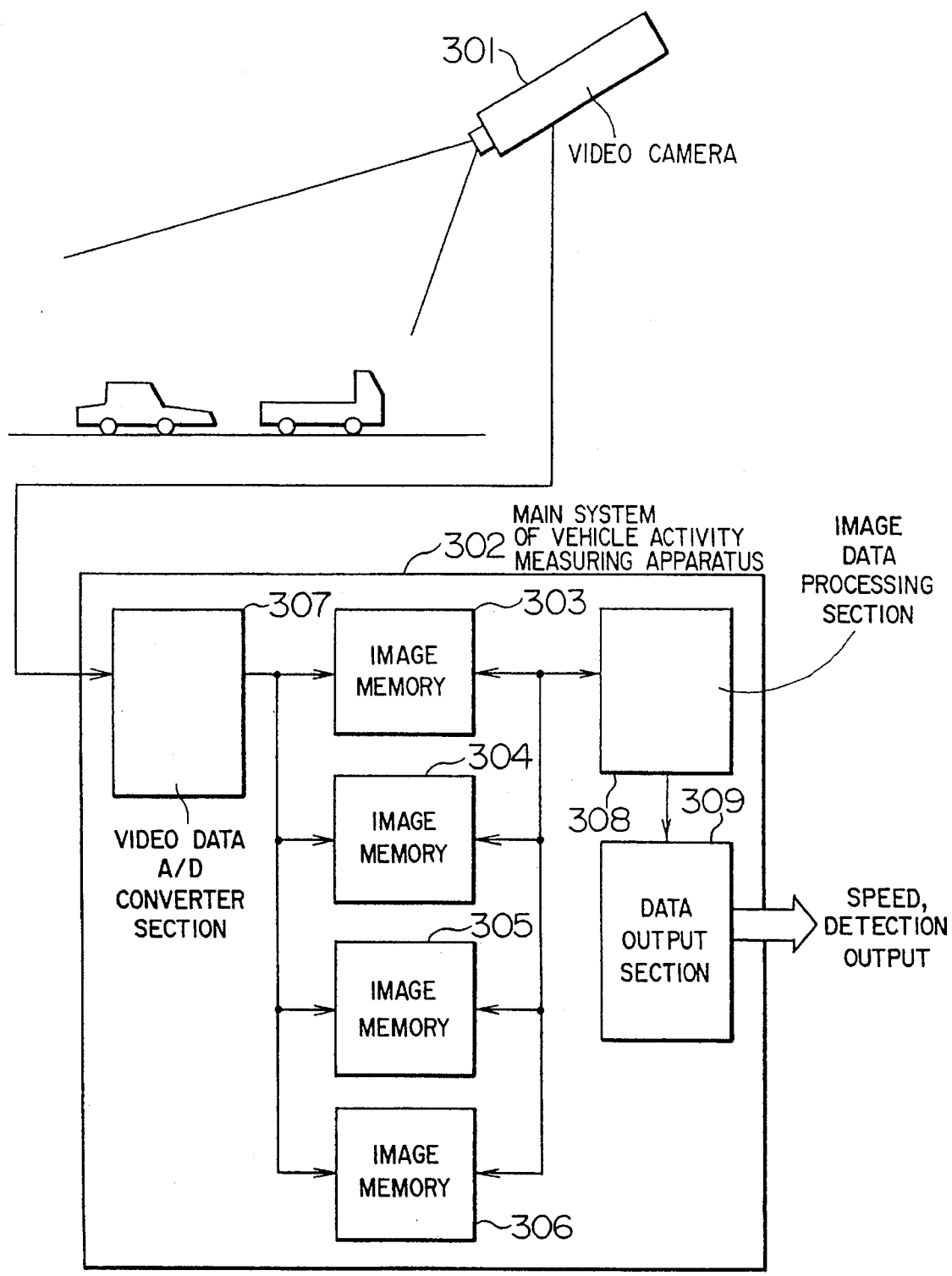
FIG. 18 is a block diagram of a fourth embodiment of the vehicle activity measuring apparatus according to the present invention.

FIG. 18 shows a fourth embodiment of the present invention. In FIG. 18, the reference numeral 301 denotes a video camera, 302 denotes a main system of the vehicle activity measuring apparatus, 303 denotes an image memory for the first input image, 304 denotes an image memory for the second input image, 305 denotes an image memory for the third input image, 306 denotes an image memory for the fourth input image, 307 denotes a video data A/D converting section, 308 denotes an image data processing section and 309 denotes a data output section.

Next, operation of the above-mentioned fourth embodiment will be discussed. In the above-mentioned fourth embodiment, video information picked up by a video camera 301 is transferred to the main system 302 of the vehicle activity measuring apparatus. In the main system 302 of the vehicle activity measuring apparatus, the supplied image information is converted into digital data by the video data A/D converting section 307. Then, digital data for two frames of images respectively picked up and having a given interval is stored in the image memories 303 and 304. On the other hand, image memory 305 stores a background image data of the image of the measuring area in which the vehicle does not exist. With the data in the image memories 303, 304 and 305, the image data processing section 308 performs image processing. The result of image processing is written in the image memory 306. Extraction of the vehicle image is performed with respect to the resultant data stored in the image memory 306. By continuously performing extraction of the vehicle image, tracing of a vehicle is performed for measuring the traveling speed and so forth to output a vehicle activity data to the data output section 309. The current condition on the road is discriminated to perform updating of the background data based thereon.

Figure 19:
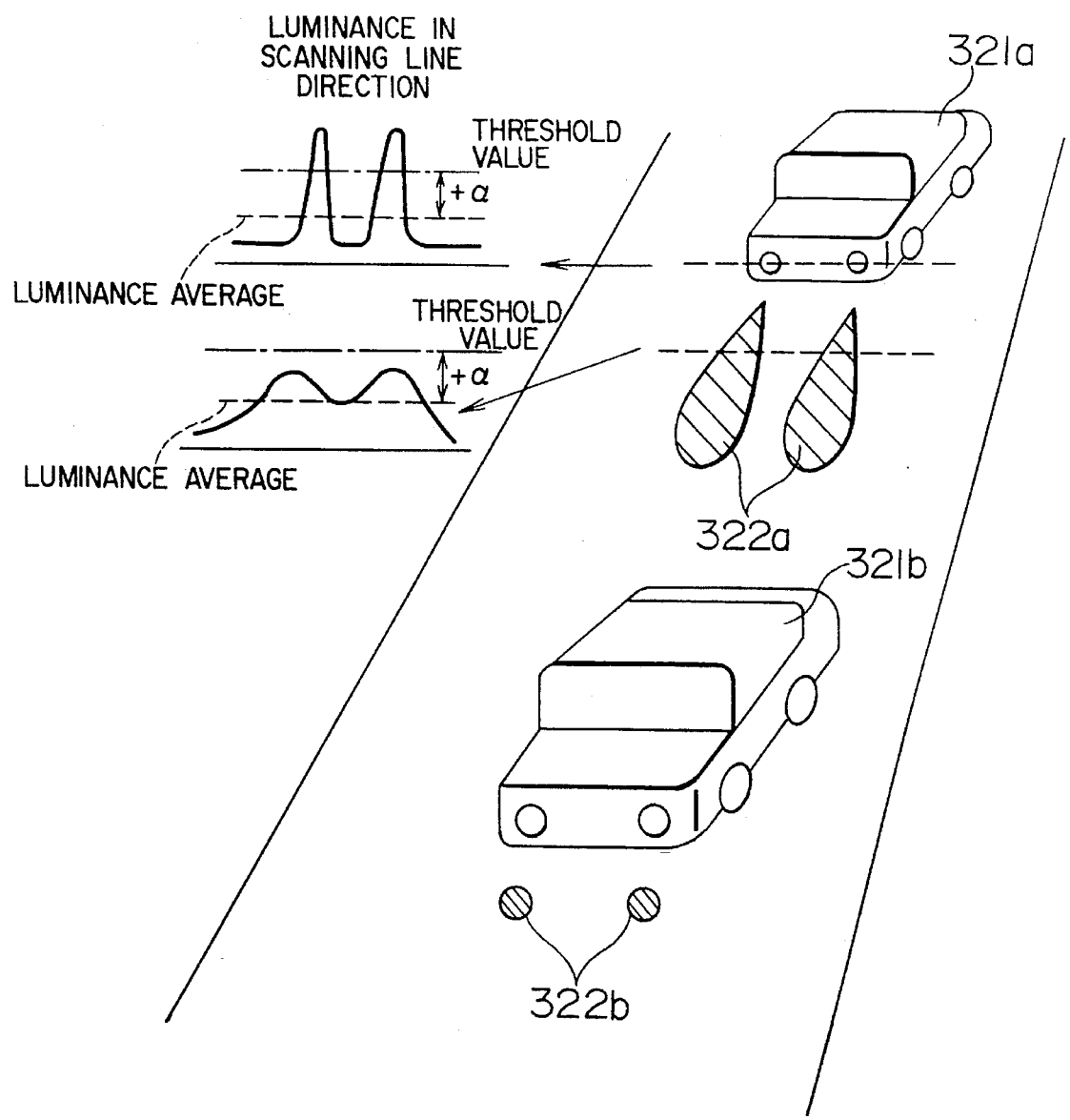
FIG. 19 is an explanatory illustration showing reflection of the head lamps from the road surface in the rain in the nighttime in the fourth embodiment.

Next, discussion will be given for a method for removing head light reflection from the road surface in the rain at night. FIG. 19 shows the head light reflected from the road surface in the rain at night. As should be understood from this figure, the reflected head lights 322a of the vehicle 321a, such as an automobile, reflected from the road surface, are an elongated configuration at a position far from the video camera 301 and the luminance level of the reflected head lights 322a are relatively low. According to the approaching of the vehicle 321a to the video camera 301, the reflected head lights 322a become shorter, that is, less elongated, and the luminance increases. When the vehicle 321a reaches the second imaging position, the reflected head lights of the vehicle 321b become spot configurations and the luminance becomes equivalent to the direct head lights.

For the road surface reflection such as that of 322a, it is possible to avoid the influence thereof since it can be distinguished whether direct head lights or reflected head lights are present by varying a threshold value for the luminance of the image data based on the average values for respective scanning lines. On the other hand, with respect to the road reflection such as those of 322b, from the position where a probable front end of a vehicle is first detected, detection of another probable front end is continued for an average length of a vehicle. When another probable front end is detected behind the first detected probable front end during continuation of detection of the front end over the average vehicle length, a judgment can be made that the first detected probable front end is road reflection and the following probable front end is the true front end of the vehicle.

Figure 20:
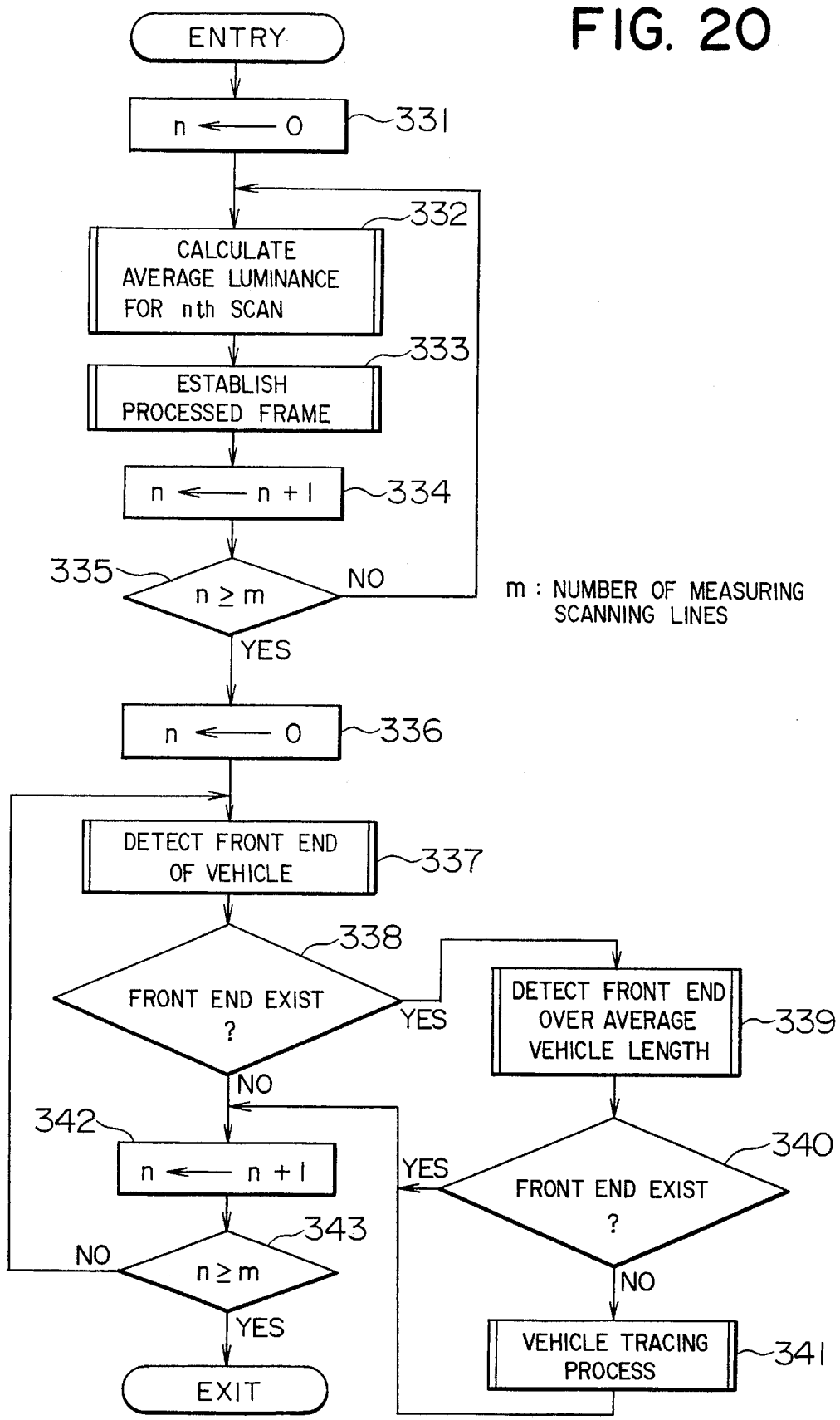
FIG. 20 is a flowchart showing operation of the fourth embodiment.

Next, discussion will be given for a basic algorithm for a method of avoiding road reflection of the head light in the rain at night with reference to FIG. 20. At first, with respect to each of the scanning lines, an average value of the luminance is derived (steps 331, 332). Then, based on the average values of the luminance, threshold values for respective scanning lines are established for forming a processed frame (step 333). This process is repeated for the times corresponding to the measuring scanning lines (steps 334, 335, 336). Subsequently, for each of the scanning lines, extraction of the front end image (head light) of the vehicle is performed (step 337). Then, a judgment is made to determine whether a probable front end exists on the respective scanning lines (step 338). If a judgment is made that a probable front end is present, detection is subsequently continued to detect the front end (head light) of the vehicle over an average length of a vehicle (step 339) and thus performs a judgment to determine whether a probable front end is present (step 340). When another probable front end cannot be detected at the rear position of the first detected probable front end within the length of an average vehicle, then the first detected probable front end is judged as the front end of the vehicle for performing a tracing process for the probable front end judged as the true front end of the vehicle (step 341). The foregoing process is repeated for the number of times corresponding to the number of the measuring scanning lines (steps 342, 343).

Through the process set forth above, since the influence of road reflection of head lights can be successfully avoided, accurate extraction of the front end image of the vehicle becomes possible irrespective of the weather and thus enhances accuracy of measurement of the vehicle speed at night.

FIG. 21 shows a principle of simplified coordinate conversion in a fifth embodiment of the invention.

Figure 21A:
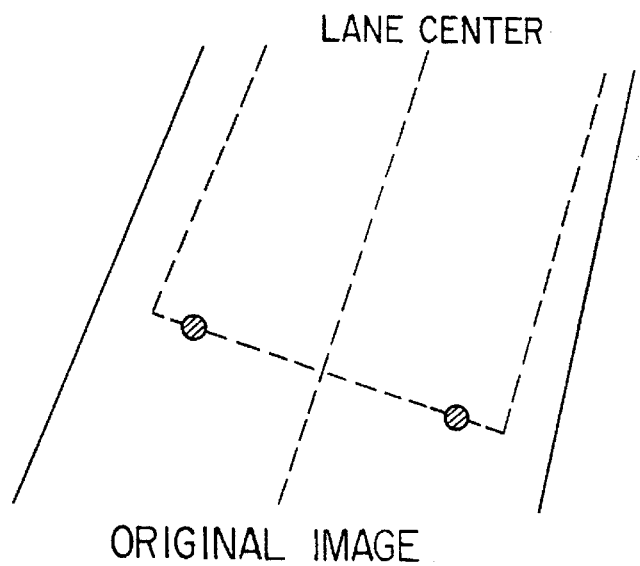
FIG. 21A is a diagrammatic illustration of an example of a current image to be a subject for simplified coordinate conversion in a fifth embodiment.

In general, the image data in the vehicle activity measuring apparatus is rarely taken just in front of the vehicle and mostly become an oblique image as shown in FIG. 21A. In the prior art, head lights are traced in pairs at night. Since image processing is performed with respect to each scanning line, coordinate conversion is performed for the processed frame so that both head lights are positioned on the same scanning line. Assuming that the original coordinate (X, Y) before coordinate conversion is converted into the converted coordinate (X', Y'), and the shifting angle is θ, the coordinate conversion can be expressed by the following equations (4):

$$X' = X \cos\theta + Y \sin\theta$$

$$Y' = X \sin\theta + Y \cos\theta \quad (4)$$

Figure 21B:
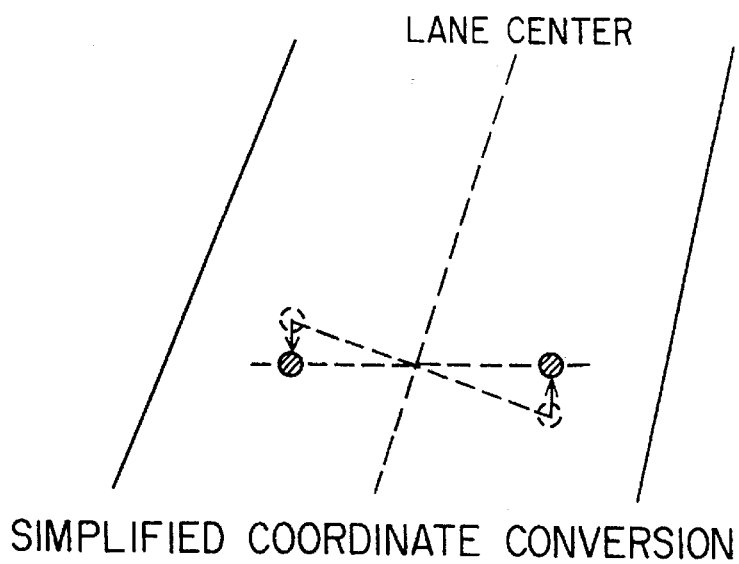
FIG. 21B is a diagrammatic illustration showing the result of simplified coordinate conversion.

However, when the coordinate conversion is performed employing the foregoing equations, it may take a long process period. Therefore, such a conversion is inappropriate for the vehicle activity measuring apparatus which should be operated in real time. Accordingly, in the present invention, as shown in FIG. 21B, a method is employed to cause shifting of coordinates only in the vertical direction so that both the head lights are positioned on the same scanning line. Here, such manner of coordinate conversion will be called a simplified coordinate conversion. With taking the gradient on the image as m and the coordinate of the lane center in the X direction is c, the simplified coordinate conversion can be expressed by the following equations (5):

$$X' = X$$

$$Y' = Y + m*(X-c) \quad (5)$$

Figure 22:
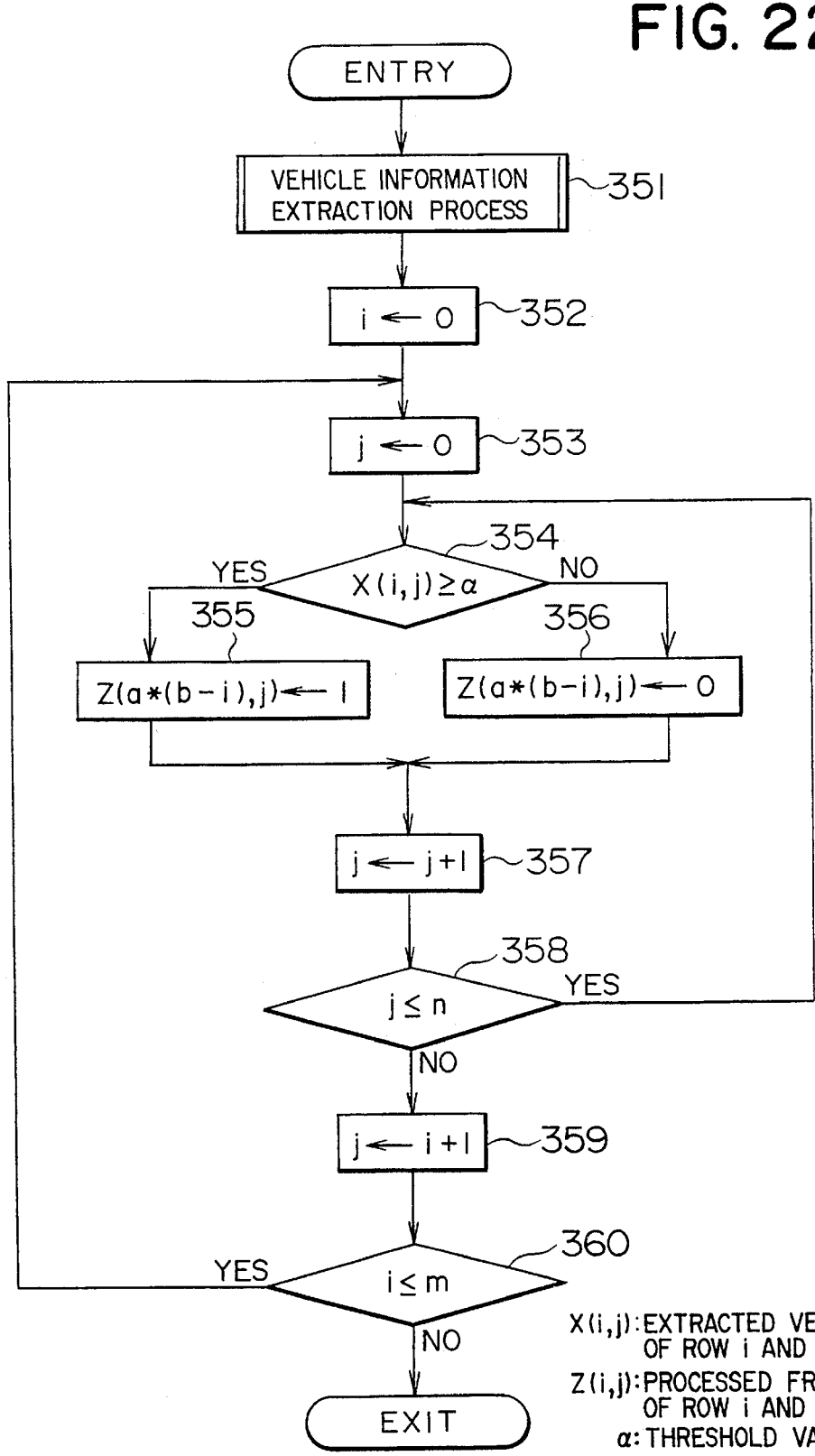
FIG. 22 is a flowchart showing operation of the fifth embodiment.

Further discussion will be given for the basic algorithm for detecting the small lamps or so forth employing the simple coordinate conversion as set forth above, with reference to FIG. 22. At first, through the method discussed in the foregoing embodiments, the front end image of the vehicle is extracted by a differentiation process, calculation of a difference between the background and image data or a difference between frames of the image data, to form an extracted data (step 351). Then, with respect to each pixel, comparison of the extracted data and a threshold value is performed (steps 352, 353, 354). When the extracted data is greater than the threshold value, "0" is written in the coordinate position as converted by simplified coordinate conversion employing the foregoing equations (5) (steps 355, 356). This process is performed for all of the extracted data for the vehicle to form the processed frame (steps 357, 358, 359, 360).

Through the process as set forth above, the fifth embodiment allows detection not only for head lights but also for small lamps or so forth which have lower luminance and stimulate a smaller number of pixels, and thus can improve accuracy of measurement of the vehicle speed in the nighttime.

As should be clear from the foregoing embodiment, the present invention achieves the following advantages. First of all, since the influence of the road reflection of head lights in the rain at night can be successfully avoided, accurate extraction of the front end image of the vehicle becomes possible irrespective of the weather to enhance accuracy of measurement of the vehicle speed in the night.

Secondly, since it becomes possible to detect the small lamps or so forth which have lower luminance and stimulate small number of pixels, accurate measurement of the vehicle can be realized.

What is claimed is:

1. A vehicle activity measuring apparatus comprising:

a video camera for picking up an image of a road, on which a vehicle is traveling, and a background image of the road on which no vehicle is traveling, and for outputting the image of the road every frame and the background image of the road;

a first storage means for storing the images to the road for a predetermined number of frames and the background image of the road;

image processing means for extracting the vehicle which is traveling on the road based on the image of the road and the background image of the road, both of which are stored in the first storage means, to produce vehicle information on the extracted vehicle, every frame, and for assigning an identification number to the vehicle information when the vehicle is extracted for the first time, the vehicle information containing position information of the extracted vehicle;

a second storage means for storing the vehicle information in a storage area identified by the identification number; and a computer for calculating an instantaneous vehicle speed of the extracted vehicle based on the position information contained in the vehicle information stored in the second storage means and then weighing the instantaneous vehicle speed, every frame, and for calculating a vehicle speed of the extracted vehicle based on an average of the weighted instantaneous vehicle speeds over the predetermined number of frames.

2. A vehicle activity measuring apparatus as set forth in claim 1, wherein even if the image processing means provides faulty vehicle information in at least one frame, the computer predicts the vehicle speed of the extracted vehicle based on the average of the weighted instantaneous vehicle speeds over the predetermined number of frames.

3. A vehicle activity measuring apparatus comprising:

a video camera for picking up an image of a road, on which a vehicle is traveling, and a background image of the road on which no vehicle is traveling, and for outputting the image of the road and the background image of the road; and image processing means for processing the image of the road and the background image of the road to extract the traveling vehicle, wherein the road is divided into a plurality of lanes, wherein said image processing means divides each lane into a left side zone, a center zone and a right side zone, classifies the extracted vehicle into a small size vehicle, a large size vehicle or a part of a vehicle by measuring the width of the extracted vehicle, and determines a traveling position of the extracted vehicle in one lane of the lanes by detecting in which of the left side zone, the center zone and the right side zone of the one lane the left and right side ends of the extracted vehicle are present, respectively, and wherein if the traveling vehicle performs a lane change from the one lane to an adjacent lane, said image processing means determines another traveling position of the extracted vehicle in the adjacent lane, and then traces and follows the traveling vehicle on the basis of the determined traveling position of the extracted vehicle in the one lane and another determined traveling position of the extracted vehicle in the adjacent lane.

4. A vehicle activity measuring apparatus comprising:

a video camera for picking up an image of a road, on which a vehicle is traveling, and a background image of the road on which no vehicle is traveling, and for outputting the image of the road and the background image of the road; and image processing means for processing the image of the road and the background image of the road to extract the traveling vehicle, wherein the road is divided into a plurality of lanes, wherein said image processing means divides each lane into a left side zone, a center zone and a right side zone, classifies the extracted vehicle into a small size vehicle, a large size vehicle or a part of a vehicle by measuring the width of the extracted vehicle, and determines a traveling position of the extracted vehicle in one lane of the lanes by detecting in which of the left side zone, the center zone and the right side zone of the one lane the left and right side ends of the extracted vehicle are present, respectively, and wherein if said image processing means detects that the vehicle traveling in the one lane is a large size vehicle, said image processing means avoids an influence of the traveling vehicle for a vehicle activity measurement on another vehicle which is traveling in a lane adjacent to the one lane.

5. An apparatus for measuring vehicle activity, comprising:

a first storage device for storing images of a road on which a vehicle is traveling for a predetermined number of frames and a background image of the road without a vehicle on it;

an image processor for extracting the vehicle which is traveling on the road based on the image of the road and the background image of the road stored in the first storage device to produce vehicle information on the extracted vehicle, every frame, and for assigning an identification number to the vehicle information when the vehicle is extracted for the first time, the vehicle information containing position information of the extracted vehicle;

a second storage device for storing the vehicle information in a storage area identified by the identification number; and a processor for calculating an instantaneous vehicle speed of the extracted vehicle based on the position information contained in the vehicle information stored in the second storage device and then weighing the instantaneous vehicle speed, every frame, and for calculating a vehicle speed of the extracted vehicle based on an average of the weighted instantaneous vehicle speeds over the predetermined number of frames.

6. An apparatus for measuring vehicle activity according to claim 5, wherein the processor predicts the vehicle speed of the extracted vehicle based on the average of the weighted instantaneous vehicle speed over the predetermined number of frames if the image processor produces faulty vehicle information in at least one frame.

7. A method for measuring vehicle activity comprising the steps of:

storing images of a road on which a vehicle is traveling for a predetermined number of frames and a background image of the road without a vehicle on it, the road having a plurality of lanes;

extracting the vehicle based on the image of the road and the background image;

dividing each lane into a left side zone, a center zone, and a right side zone;

classifying the extracted vehicle as a small size vehicle, a large size vehicle or a part of a vehicle by measuring the width of the extracted vehicle;

determining the traveling position of the extracted vehicle in one of the lanes by detecting in which of the left side zone, the center zone, and the right side zone of said one of the lanes the left and right side ends of the extracted vehicles are present, respectively; and determining another traveling position of the extracted vehicle in a lane adjacent to said one of the lanes if the vehicle performs a lane change from said one of the lanes to the adjacent lane.

8. A method for measuring vehicle activity according to claim 7, further comprising the step of tracing the vehicle when the vehicle changes lanes.

9. A method for measuring vehicle activity comprising the steps of:

storing images of a road on which a vehicle is traveling for a predetermined number of frames and a background image of the road without a vehicle on it, the road having a plurality of lanes;

extracting the vehicle based on the image of the road and the background image;

dividing each lane into a left side zone, a center zone, and a right side zone;

classifying the extracted vehicle as a small size vehicle, a large size vehicle or a part of a vehicle by measuring the width of the extracted vehicle;

determining the traveling position of the extracted vehicle in one of the lanes by detecting in which of the left side zone, the center zone, and the right side zone of said one of the lanes the left and right side ends of the extracted vehicles are present, respectively; and reducing a measurement area associated with said one of the lanes if a vehicle classified as a large size vehicle is in a lane adjacent to said one of the lanes to keep the large size vehicle from influencing a measurement of vehicle activity in said one of the lanes.

10. A method for measuring vehicle activity comprising the steps of:

storing images of a road with a vehicle on it for a predetermined number of frames and a background image of the road without the vehicle on it;

extracting the vehicle based on the image of the road and the background image;

establishing a presence detection measuring area of the image of the road;

calculating a first average luminance and a first most frequently occurring value of luminance in the presence detection measuring area;

calculating a second average luminance and a second most frequently occurring value of luminance in the presence detection measuring area of the background image of the road; and detecting whether the vehicle is stopped during the daytime based on the first and second average luminances and the first and second most frequently occurring value of luminance.

11. A method for measuring vehicle activity according to claim 10, further comprising the step of detecting a stopped vehicle at night based on a frequency of occurrence of luminance values in the measuring area, the measurement area being divided into first and second sub-zones.

12. A vehicle activity measuring apparatus comprising:

a video camera for picking up an image of a road, on which a vehicle is traveling or stopped, and a background image of the road on which no vehicle is traveling or stopped, and for outputting the image of the road every frame and the background image of the road; and image processing means for processing the image of the road and the background image of the road to extract the vehicle, wherein said image processing means sets a presence detection measuring area on the road, calculates a first average luminance and a first most frequently occurring value of luminance in the presence detection measuring area of the image of the road, calculates a second average luminance and a second most frequently occurring value of luminance in the presence detection measuring area of the background image of the road, and detects whether or not the extracted vehicle is stopped on the road during the daytime, on the basis of the first and second average luminances and the first and second most frequently occurring values of luminance.

13. A vehicle activity measuring apparatus comprising:

a video camera for picking up an image of a road, on which a vehicle is traveling or stopped, and a background image of the road on which no vehicle is traveling or stopped, and for outputting the image of the road every frame and the background image of the road; and image processing means for processing the image of the road and the background image of the road to extract the vehicle, wherein said image processing means sets a presence detection measuring area on the road, separates the presence detection measuring area into left and right sub-zones, calculates a first most frequently occurring value of luminance in the left sub-zone of the image of the road, calculates a second most frequently occurring value of luminance in the right sub-zone of the image of the road, calculates a third most frequently occurring value of luminance in the left sub-zone of the background image of the road, calculates a fourth most frequently occurring value of luminance in the right sub-zone of the background image of the road, and detects whether or not the extracted vehicle is stopped on the road at night on the basis of the first to fourth most frequently occurring values of luminance.

* * * * *